(12) United States Patent
Manzalini et al.

(10) Patent No.: US 9,009,211 B2
(45) Date of Patent: Apr. 14, 2015

(54) DISTRIBUTED SERVICE FRAMEWORK

(75) Inventors: Antonio Manzalini, Turin (IT); Corrado Moiso, Turin (IT)

(73) Assignee: Telecom Italia S.p.A., Milan (IT)

( * ) Notice: Subject to any disclaimer, the term of this patent is extended or adjusted under 35 U.S.C. 154(b) by 1046 days.

(21) Appl. No.: 12/937,620

(22) PCT Filed: Apr. 14, 2008

(86) PCT No.: PCT/EP2008/002935
§ 371 (c)(1),
(2), (4) Date: Oct. 20, 2010

(87) PCT Pub. No.: WO2009/127219
PCT Pub. Date: Oct. 22, 2009

(65) Prior Publication Data
US 2011/0047084 A1  Feb. 24, 2011

(51) Int. Cl.
| G06F 15/16 | (2006.01) |
| G06Q 10/00 | (2012.01) |
| G06F 9/50  | (2006.01) |
| G06Q 10/10 | (2012.01) |

(52) U.S. Cl.
CPC .............. *G06F 9/505* (2013.01); *G06F 9/5055* (2013.01); *G06F 9/5072* (2013.01); *G06Q 10/103* (2013.01); *G06F 2209/5022* (2013.01)

(58) Field of Classification Search
USPC ........... 705/1.1, 301; 709/201, 236, 231, 232, 709/224, 229, 203, 206, 207, 219
See application file for complete search history.

(56) References Cited

U.S. PATENT DOCUMENTS

| 7,228,550 B1 * | 6/2007 | Eberhard et al. ............... 719/312 |
| 7,519,577 B2 * | 4/2009 | Brundage et al. ..................... 1/1 |
| 7,610,330 B1 * | 10/2009 | Quinn et al. ................... 709/201 |
| 2005/0223111 A1 * | 10/2005 | Bhandaru et al. ............. 709/236 |

OTHER PUBLICATIONS

International Search Report from the European Patent Office in International Application No. PCT/EP2008/002935 mailed Apr. 20, 2009.
Adam, et al., "A Service Middleware that Scales in System Size and Applications", IM '07; $10^{TH}$ IFIP IEEE Symposium on Integrated Network Management, pp. 70-79, XP031182680, May 1, 2007).
(Continued)

*Primary Examiner* — Jude Jean Gilles
(74) *Attorney, Agent, or Firm* — Finnegan, Henderson, Farabow, Garrett & Dunner, L.L.P.

(57) ABSTRACT

A system for executing services in a distributed way, the execution of each service involving the processing of a plurality of tasks of predetermined types, each task type to be processed being represented by a corresponding type of tuples of data relating to the task type, wherein: the system includes a plurality of peer entities; each peer entity being adapted to store and execute a plurality of worker modules, each worker module being adapted to process at least one task type; each peer entity including tuple handling modules that, for a tuple of a type T, are adapted: a) to check if at least one of the plurality of worker modules in the peer entity is adapted to process the task represented by the tuple, b) in the positive case of a), to take charge of the processing of the task represented by the tuple, and c) in the negative case of a), to execute a forwarding procedure for forwarding the tuple to another peer entity of the plurality of peer entities of the system.

17 Claims, 10 Drawing Sheets

(56) References Cited

OTHER PUBLICATIONS

Alfano, et al., "TURBO: an autonomous execution environment with scalability and load balancing features", Distributed Intelligent Systems: Collective Intelligence and its Applications, DIS 2006, IEEE Workshop on Prague, Czech Republic, XP010920112, pp. 377-382, (Jun. 15, 2006).

Gelernter, "Generative Communication in Linda", ACM Transactions on Programming Languages and Systems, vol. 7, No. 1, pp. 80-112, (Jan. 1985).

Sun Microsystems, Jini Architectural Overview, Technical White Paper, pp. 1-24, (1999).

Lua, et al., "A Survey and Comparison of Peer-to-Peer Overlay Network Schemes", IEEE Comunications Surveys and Tutorials, Second Quarter, vol. 7, No. 2, XP007905842, pp. 72-93, (2005).

Lua, et al., "A Survey and Comparison of Peer-to-Peer Overlay Network Schemes", IEEE Communications Survey and Tutorial, pp. 1-22, (Mar. 2004).

\* cited by examiner

DISTRIBUTED SERVICE FRAMEWORK

CROSS REFERENCE TO RELATED APPLICATION

This application is a national phase application based on PCT/EP2008/002935, filed Apr. 14, 2008, the content of which is incorporated herein by reference.

BACKGROUND OF THE INVENTION

1. Field of the Invention

The present invention relates to a distributed service framework for executing services in a distributed way.

2. Description of the Related Art

C. Adam et al. ("A service Middleware that scales in System Size and Applications", 10th IFIP/IEEE International Symposium on Integrated Network Management (IM-2007), Munich, Germany, May 21-25, 2007, pages 70-79) disclose a peer-to-peer service management middleware that dynamically allocates system resources to a large set of application services. A possible deployment scenario described by the Authors includes a cluster, comprising several data centers, and many entry points. Each data centre includes a plurality of nodes. Each node can run concurrently instances of several applications. Service requests enter the cluster through the entry points that direct incoming requests to the nodes using a round-robin forwarding policy. Upon receiving a request from an entry point, a node determines the application type thereof. The node processes the request if it runs the corresponding application and if the CPU utilization is below a configurable threshold. Otherwise the node consults its forwarding table and routes the request to a peer that offers the required application. The forwarding table contains, for each application offered in the system, a configurable number of nodes that run that particular application. The entries of the forwarding table are soft state, and each entry expires after a preconfigured timeout. Therefore, each node advertises its complete configuration after each placement cycle.

Rosario Alfano and Gaetano di Caprio ("TURBO: an autonomous execution environment with scalability and load balancing features", IEEE Workshop on Distributed Intelligent Systems: Collective Intelligence and Its Applications, Jun. 15-16, 2006, Pages 377-382) disclose a distributed execution environment "Telco Uniform Request Balancer" (TURBO) adopting the Linda model as basic way to distribute task execution requests.

According to Linda Model (disclosed for example by David Gelernter, "Generative Communication in Linda", ACM Transactions on programming Languages and Systems, Vol. 7, No. 1, January 1985, pages 80-112), workers execute tasks; each task execution request is a Linda Tuple written on a Linda tuple space, named blackboard; a Linda take, operation is used by workers to offer their process capability. Each worker takes a tuple from the blackboard only if it is ready to execute it.

In TURBO, Rosario Alfano and Gaetano di Caprio introduce a Collector entity in the Linda model. The Authors state that a collector can be seen as a blackboard that incorporates a number of workers, i.e. a blackboard with execution capabilities. A collector acts towards other Collector as a worker: it executes take operations in order to transfer tuples on its blackboard from overloaded collectors. In TURBO, given a set of collectors containing in their blackboard tuples representing the task to execute, load balancing is achieved by having each collector calculating its own residual power (RP) which represent its ability to help others. When a collector realizes that it has some RP available (a few tuples in its blackboard) it offers its computational power to other collector, just sending them a notification of availability. Overloaded collectors accept one of the possible computational power offers. When a collector receives acknowledge to its computational power offers, it begin to take tuples from the collector in trouble. Therefore, according to TURBO system, when a collector is overloaded it must only check if it has received some help offers from other collectors and accept them.

Accordingly, TURBO provides a load balancing system to distribute load among collectors evenly.

SUMMARY OF THE INVENTION

The Applicant faced the problem of providing a distributed service framework for the execution of services in a distributed way, which guarantees high performances, scalability and robustness.

Accordingly, in a first aspect the present invention relates to a system for executing services in a distributed way, the execution of each service involving the processing of a plurality of tasks of predetermined types, each task type to be processed being represented by a corresponding type of tuples of data relating to the task type, wherein:

the system comprises a plurality of peer entities;

each peer entity is adapted to store and execute a plurality of worker modules, each worker module being adapted to process at least one task type;

each peer entity also comprises tuple handling modules that, for a tuple of a type T, are adapted:

a) to check if at least one of the plurality of the worker modules comprised in the peer entity is adapted to process the task represented by the tuple, b) in the positive case of a), to take in charge the execution of the task represented by the tuple, c) in the negative case of a), to execute a forwarding procedure for forwarding the tuple to another peer entity of the plurality of peer entities of the system.

Advantageously, the system further comprises a plurality of client entities, each client entity being adapted to send service requests to at least one of the plurality of peer entities.

Advantageously, at the receipt of a service request from a client entity, each peer entity is adapted to generate a tuple of data representing one of the plurality of tasks involved in the execution of the requested service. Preferably, the tuple of data generated by the peer entity represents the first task to be processed for the execution of the requested service. Advantageously, a), b) and c) are performed on the tuple generated by the peer entity.

According to an embodiment, each worker module is adapted to execute a task involved in the execution of a service by consuming the tuple representing such task and by producing a tuple representing another task of the plurality of tasks involved in the execution of the service.

Advantageously, a), b) and c) are performed on a tuple produced by a worker module of the peer entity.

Advantageously, a), b) and c) are performed on a tuple received by another peer entity of the plurality of peer entities.

Advantageously, each peer entity comprises tuple space modules adapted to handle storing of a predetermined number of tuples in the peer entity. Advantageously, the tuple space modules are adapted to classify the predetermined number of tuples stored in the peer entity according to a first and a second group of tuples, the first group comprising tuple types representing task types to be processed by the worker modules of the peer entity, the second group comprising tuple types representing task types that cannot be processed by the worker modules of the peer entity.

Advantageously, each peer entity comprises worker execution environment modules adapted to retrieve tuples from the first tuple group and to activate corresponding worker modules of the peer entity, which are able to process the corresponding task types represented by the retrieved tuples. Advantageously, said worker execution environment modules are adapted to retrieve the tuples from the first tuple group according to predetermined scheduling policies.

Advantageously, b) is carried out by storing the tuple in the first tuple group of the peer entity.

Advantageously, the tuple handling modules of each peer entity are adapted to handle a linked-peer-table stored in the peer entity for associating, with each tuple type of a predetermined number of tuple types, a list of linked peer entities of the system that comprise worker modules adapted to process tuples of said tuple type.

Advantageously, in the forwarding procedure of c) the tuple handling modules are adapted to access the linked-peer-table to retrieve (if any), according to predetermined forwarding policies, one of the linked peer entities that in the linked-peer-table is associated with the tuple type T. Advantageously, in c) the tuple handling modules are adapted to forward the tuple to the peer entity so retrieved.

If the linked-peer-table does not contain any linked peer entity associated with the tuple type T, the tuple space modules of the peer entity are adapted to store the tuple of type T in the second tuple group. In this case, the tuple handling modules are advantageously adapted to send to a number of peer entities of the system, selected according to predetermined policies from those listed in the linked-peer-table stored in the peer entity, a request for a peer entity of the system that comprises at least one worker module adapted to execute tuples of the type T.

At the receipt of a response to said request, the peer entity is adapted to update the linked-peer-table stored therein with the information received in said response.

Advantageously, after updating the linked-peer-table, the tuple handling modules are adapted to activate again the forwarding procedure of c).

Advantageously, each client entity is adapted to register with at least one of the plurality of peer entities so as to be enabled to send service requests to it. Advantageously, each client entity is adapted to send service requests to the at least one of the plurality of peer entities it is registered with.

Advantageously, each peer entity comprises load handling modules adapted to periodically check the workload (with respect to tuples processing) of the peer entity. If the workload is lower than a predetermined threshold, the peer entity is advantageously adapted to notify it to a number of peer entities of the system. Preferably, the peer entity is adapted to notify it to the linked peer entities of the linked-peer-table thereof, which are associated with the same tuple types that can be processed by it.

Advantageously, each peer entity comprises load handling modules adapted to periodically check if in the first tuple group stored therein there is at least one tuple type having an average permanence time in the first group lower than a given threshold.

In the positive case, the load handling modules are also adapted to check, for at least another peer entity of the system, the average permanence time of said at least one tuple type in the first group of tuples of said at least another peer entity. Advantageously, the load handling modules are adapted to perform said check for the linked peer entities of the linked-peer-table of the peer entity, which are associated with said at least one tuple type.

If the average permanence time of said at least one tuple type is lower than a given threshold for said at least another peer entity of the system, the load handling modules are adapted to nominate at least one of the worker modules of the peer entity, which is able to process tuples of said at least one tuple type, as candidate for being de-allocated.

Advantageously, the load handling modules of each peer entity are also adapted to check if in the second tuple group stored in the peer entity there is at least one tuple type having an average permanence time higher than a given threshold.

In the positive case, the load handling modules are advantageously adapted to nominate a worker module, which is able to process tuples of said at least one tuple type, as candidate for being allocated within the peer entity.

Advantageously, the load handling modules of each peer entity are also adapted to check if in the second tuple group stored in the peer entity there is at least one tuple type having a life-time almost to expire.

In the positive case, the load handling modules are adapted to nominate a worker module, which is able to process tuples of said at least one tuple type, as candidate for being allocated within the peer entity.

Advantageously, when in the forwarding procedure of c) the request for a peer entity of the system that comprises at least one worker module adapted to execute tuples of type T fails, the load handling modules are adapted to nominate a worker module, which is able to process tuples of type T, as candidate for being allocated within the peer entity.

Advantageously, a peer entity is adapted to actually de-allocate a worker module, nominated as candidate for worker module de-allocation, when in the peer entity there is at least one other worker module nominated as candidate for worker allocation.

Advantageously, a peer entity is adapted to actually allocate a worker module candidate for worker allocation when the workload of the peer entity is lower than a predetermined threshold.

Advantageously, a peer entity is adapted to actually allocate a worker module candidate for worker allocation when the peer entity has computing resources available for it.

Advantageously, when a peer entity de-allocates all the worker modules thereof that are able to execute tuples of a type T, it is adapted to notify it to at least part of the linked peer entities listed in the linked-peer-table thereof.

Advantageously, when a peer entity allocates a worker module able to execute tuples of a type T, it is adapted to notify it to at least part of the linked peer entities listed in the linked-peer-table thereof.

According to an embodiment, the peer entities of the system are deployed on a plurality of computing nodes, servers, cluster of servers and/or end-user terminals/devices, interconnected through a communication network (e.g., the Internet).

According to an embodiment, the client entities are deployed on a plurality of end-user terminals/devices.

Typical example of end-user terminals/devices are mobile phones, personal digital assistants (PDAs), Personal Computers, laptops and similar.

Typical example of services that can be executed by the system are communication-session-based services, communication session set-up services, web services, application services, content-access services, access to IT application features, and similar.

In a second aspect the present invention relates to a peer entity of a system for executing services in a distributed way, the execution of each service involving the processing of a plurality of tasks of predetermined types, each task type to be processed being represented by a corresponding type of tuples of data relating to the task type, wherein the peer entity is adapted to store and execute a plurality of worker modules, each worker module being adapted to process at least one task type, and the peer entity comprises tuple handling modules that, for a tuple of a type T, are adapted:
a) to check if at least one of the plurality of the worker modules comprised in the peer entity is adapted to process the task represented by said tuple,
b) in the positive case of a), to take in charge the processing of the task represented by said tuple,
c) in the negative case of a), to execute a forwarding procedure for forwarding said tuple to another peer entity of the system.

As far as further features of this aspect of the invention are concerned, reference is made to what disclosed above with reference to the first aspect of the invention.

In a third aspect the present invention relates to a method for handling tuples in a peer entity of a plurality of peer entities of a system for executing services in a distributed way, wherein the execution of each service involves the processing of a plurality of tasks of predetermined types, each task type to be processed is represented by a corresponding type of tuples of data relating to the task type and each peer entity of the system is adapted to store and execute a plurality of worker modules, each worker module being adapted to process at least one task type, for a tuple of a type T stored in the peer entity, the method comprising:
a) checking if at least one of a plurality of worker modules comprised in the peer entity is adapted to process the task represented by said tuple,
b) in the positive case of a), making the task represented by said tuple to be processed by said at least one of the plurality of worker modules of the peer entity that is adapted to process it,
c) in the negative case of a), to execute a forwarding procedure for forwarding said tuple to another peer entity of the plurality of peer entities of the system.

As far as further features of this aspect of the invention are concerned, reference is made to what disclosed above with reference to the other aspects of the invention.

In a further aspect the present invention relates to a method for operating a peer entity of a plurality of peer entities of a system for executing services in a distributed way, wherein the execution of each service involves the processing of a plurality of tasks of predetermined types, each task type to be processed is represented by a corresponding type of tuples of data relating to the task type and each peer entity of the system is adapted to store and execute a plurality of worker modules, each worker module being adapted to process at least one task type, the method comprising:
classifying tuples stored in the peer entity according to a first and a second group of tuples, the first group comprising tuple types representing task types that can be processed by the worker modules of the peer entity, the second group comprising tuple types representing task types that cannot be processed by the worker modules of the peer entity,
periodically checking if in the first group of tuples there is at least one tuple type having an average permanence time in the first group lower than a given threshold,
in the positive case, checking, for at least another peer entity of the system, the average permanence time of said at least one tuple type in the first group of tuples of said at least another peer entity, and
when the average permanence time of said at least one tuple type is lower than a given threshold also for said at least another peer entity of the system, nominating at least one of the worker modules of the peer entity, which is able to process tuples of said at least one tuple type, as candidate for being de-allocated by the peer entity.

As far as further features of this aspect of the invention are concerned, reference is made to what disclosed above with reference to the other aspects of the invention.

In a further aspect the present invention relates to a system for executing services in a distributed way, the execution of each service involving the processing of a plurality of tasks of predetermined types, each task type to be processed being represented by a corresponding type of tuples of data relating to the task type, wherein:
the system comprises a plurality of peer entities;
each peer entity is adapted to store and execute a plurality of worker modules, each worker module being adapted to process at least one task type;
each peer entity also comprises handling modules adapted:
to store tuples in the peer entity,
to classify the tuples stored in the peer entity according to a first and a second group of tuples, the first group comprising tuple types representing task types that can be processed by the worker modules of the peer entity, the second group comprising tuple types representing task types that cannot be processed by the worker modules of the peer entity,
to periodically check if in the first group of tuples there is at least one tuple type having an average permanence time in the first group lower than a given threshold, and, in the positive,
to check, for at least another peer entity of the system, the average permanence time of said at least one tuple type in the first group of tuples of said at least another peer entity, and
when the average permanence time of said at least one tuple type is lower than a given threshold also for said at least another peer entity of the system, to nominate at least one of the worker modules of the peer entity, which is able to process tuples of said at least one tuple type, as candidate for being de-allocated by the peer entity.

As far as further features of this aspect of the invention are concerned, reference is made to what disclosed above with reference to the other aspects of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
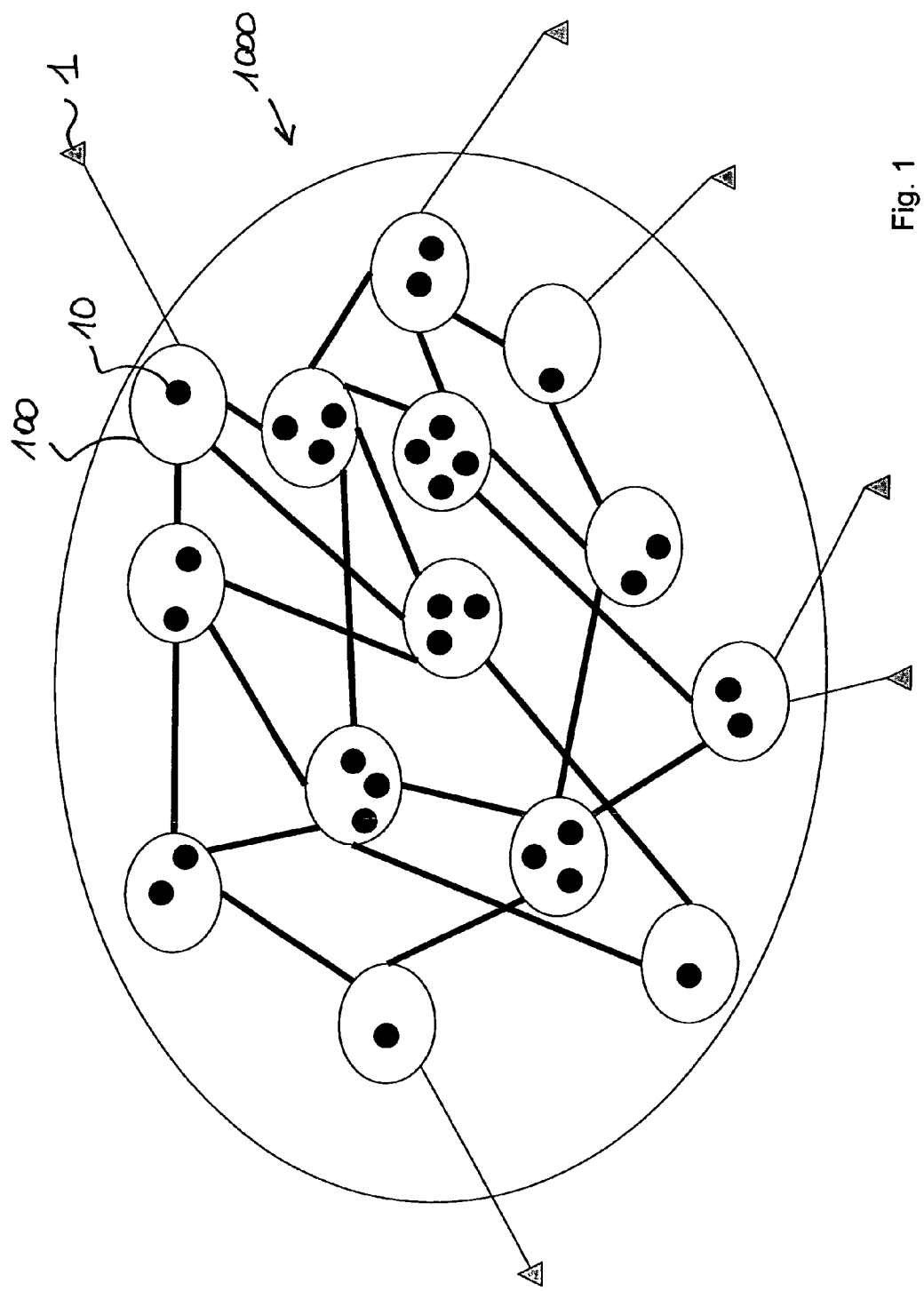
FIG. 1 schematically shows a distributed service system according to the invention.

FIG. 1 shows a system 1000 for executing services in a distributed way comprising a plurality of peer entities 100 and a plurality of client entities 1. Each peer entity 100 comprises at least one worker module 10.

Figure 2:
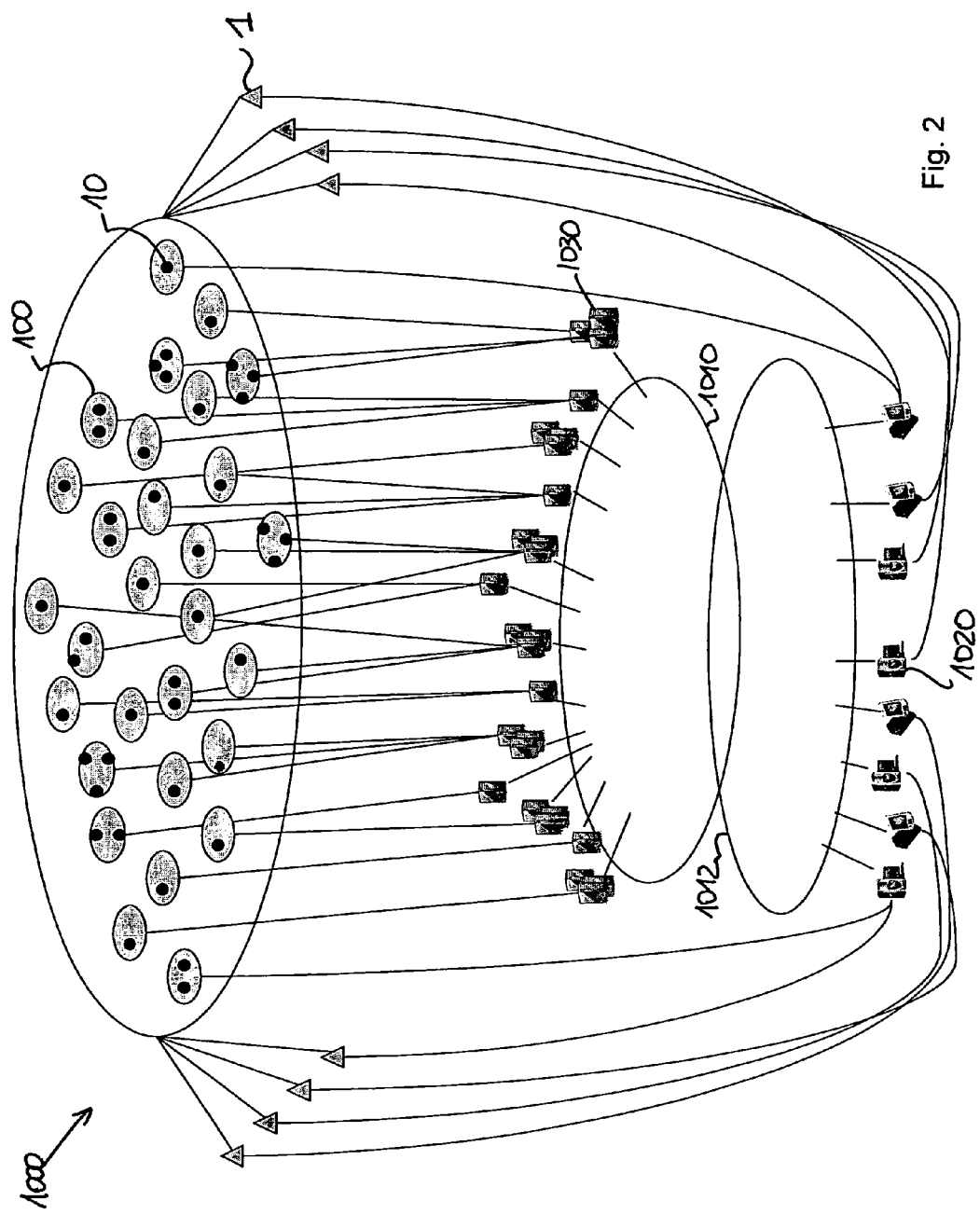
FIG. 2 schematically shows an exemplary implementation scenario for the distributed service system of FIG. 1.

As shown in FIG. 2, peer entities 100 can be deployed on a potentially huge amount of computing nodes/servers/cluster of servers 1030 and, optionally, on end-user terminals/devices 1020, interconnected through a communication network 1010 (e.g., the Internet or a network platform provided by a telecommunication network provider).

Client entities 1 can be deployed on a potentially huge amount of end-user terminals/devices 1020.

The computing nodes/servers/cluster of servers 1030 may be heterogeneous, in terms of hardware, software, operating system, and similar.

End-User terminals/devices 1020 typically are computing nodes owned and managed by end-users, adapted to perform computations on their behalf (e.g., service requests, execution of services provided to the end-user). They could be interconnected to the communication network 1010 through a telecommunication access network 1012 (such as ADSL, dial-up, GPRS, 3G UMTS, WiFi, WiMax, and similar). Moreover their addresses could be dynamically assigned and could be based, for example, on private addressing or translated to the public addresses through, e.g., Network Address Translation systems (NAT).

According to the invention, each service is decomposed in a plurality of discrete task types (a specific portion of the service logic implementing the service) and each worker module 10 is in charge of the execution of a task type.

Worker modules 10 are adapted to interact by means of tuples of data.

Tuples of data are characterized by a type that represents a corresponding type of task to be executed.

Tuples can be data structure of the following form: <tuple-type, session-id, data1, . . . , datan>, where tuple-type represents a task type to be executed, session-id is either an identifier of a service session descriptor, or an empty value, and data1, . . . , datan are data required by a worker module to execute the task type.

When a worker module 10 is ready to process a task it consumes a tuple representing such task. During the processing of a task, a worker module 10 may produce one or more tuples.

Typically, a worker module 10 does not store information of a specific task processing after the end of the processing. It can simply have a global state related to its internal behavior (e.g., for management, configuration).

Several instances of the same worker module 10 can co-exist in the same peer entity 100.

Preferably, several instances of the same worker module 10 co-exist in the same system 1000. This allows, for example, a parallel execution of tasks of the same type and the processing power of the system to be incremented.

Worker modules 10 consuming the same type of tuples could behave in different ways (e.g., as they implement different algorithms) and could be producers of tuples of different types.

Worker modules 10 advantageously have an autonomic behaviour, with a self-model (for self-management), and with tasks representing goals.

Client entities 1 are software modules adapted to send service requests to at least one of the plurality of peer entities.

The distributed service system 1000 of the invention is adapted to meet each service request by a client entity 1 by distributing the tuples, representing the tasks involved in the execution of the service, from worker modules (producers) producing tuples to worker modules (consumers) consuming tuples and by returning the result of the execution of the request to the client entity 1.

Figure 3:
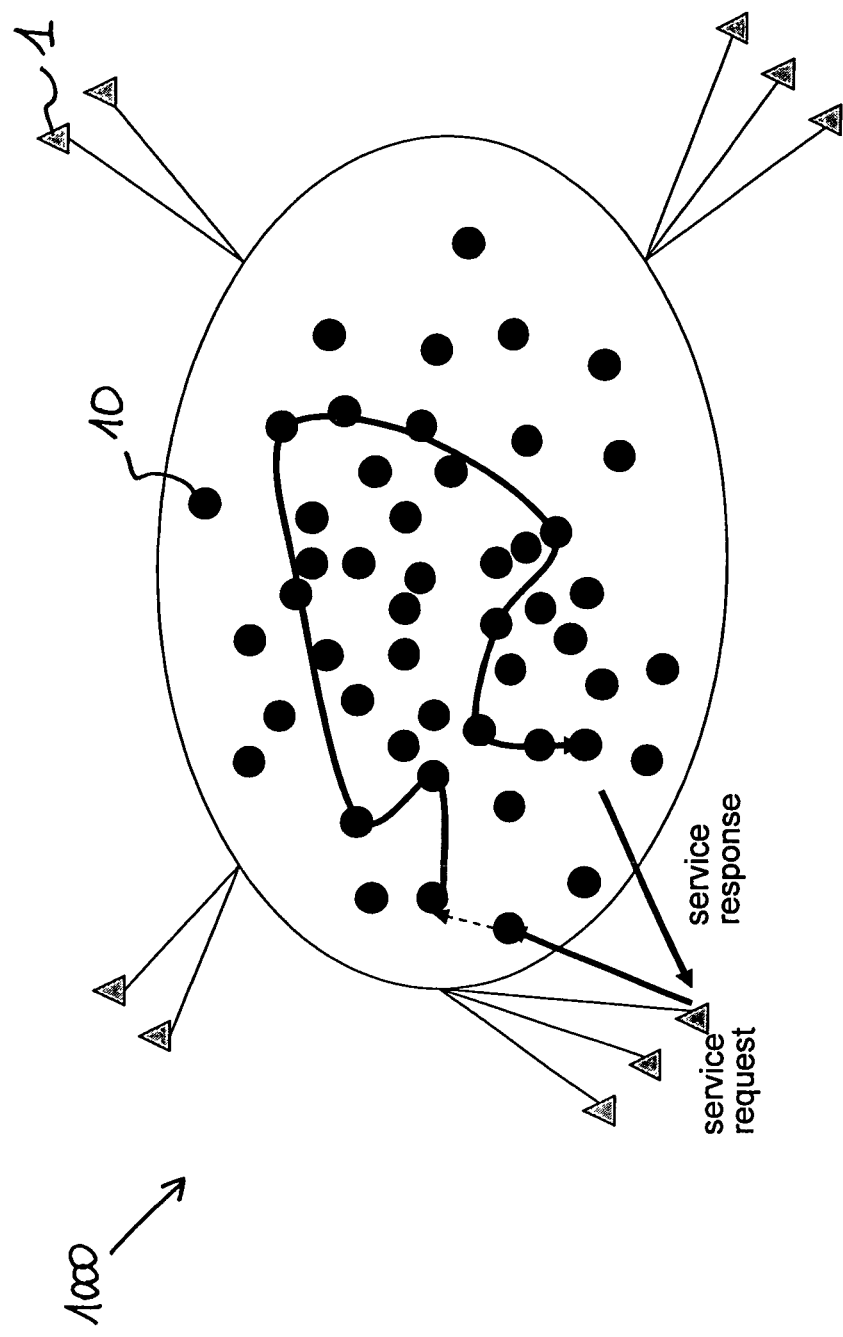
FIG. 3 schematically shows the execution of a service request according to a first embodiment of the invention.
Figure 4:
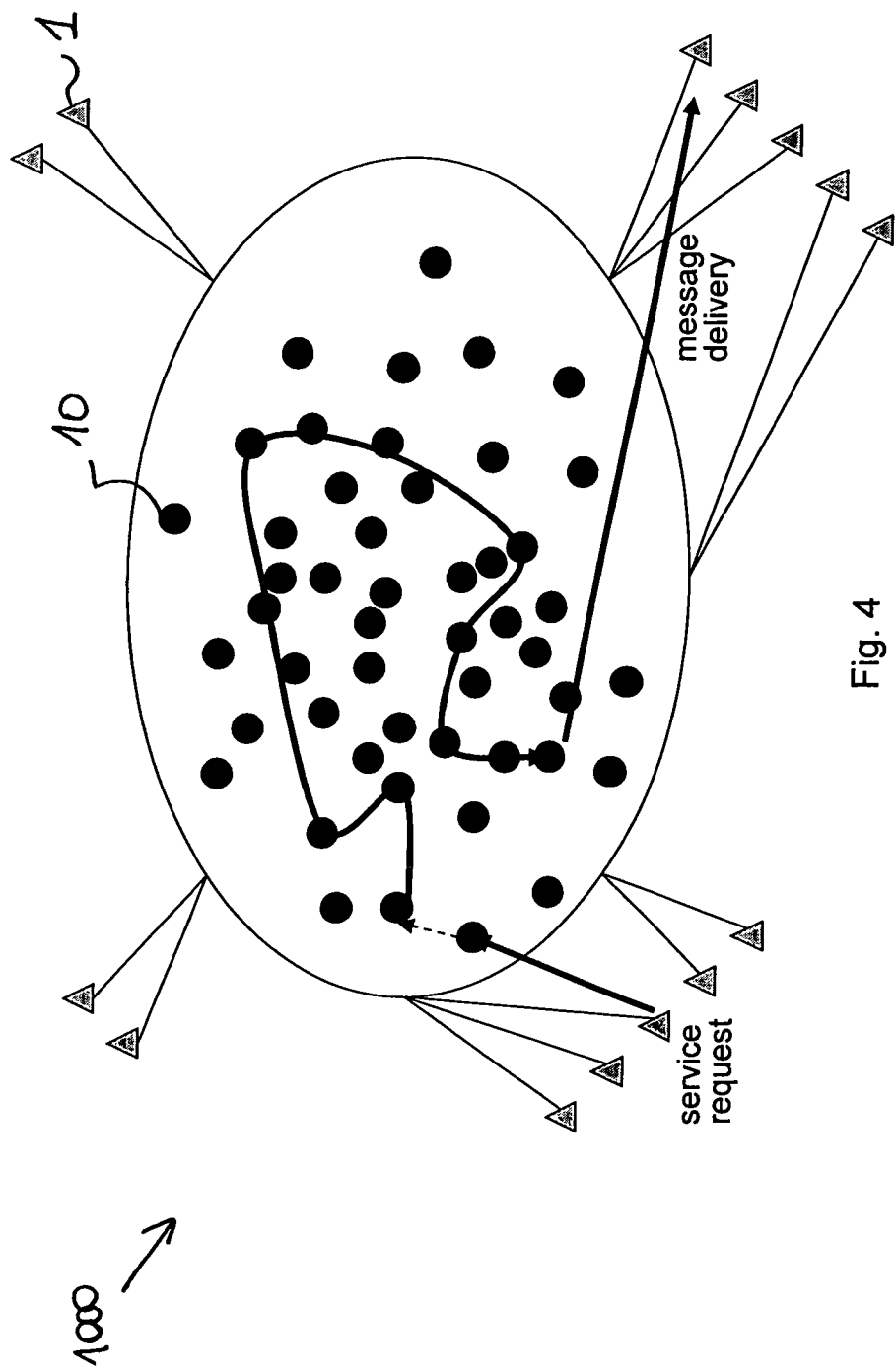
FIG. 4 schematically shows the execution of a service request according to a second embodiment of the invention.
Figure 5:
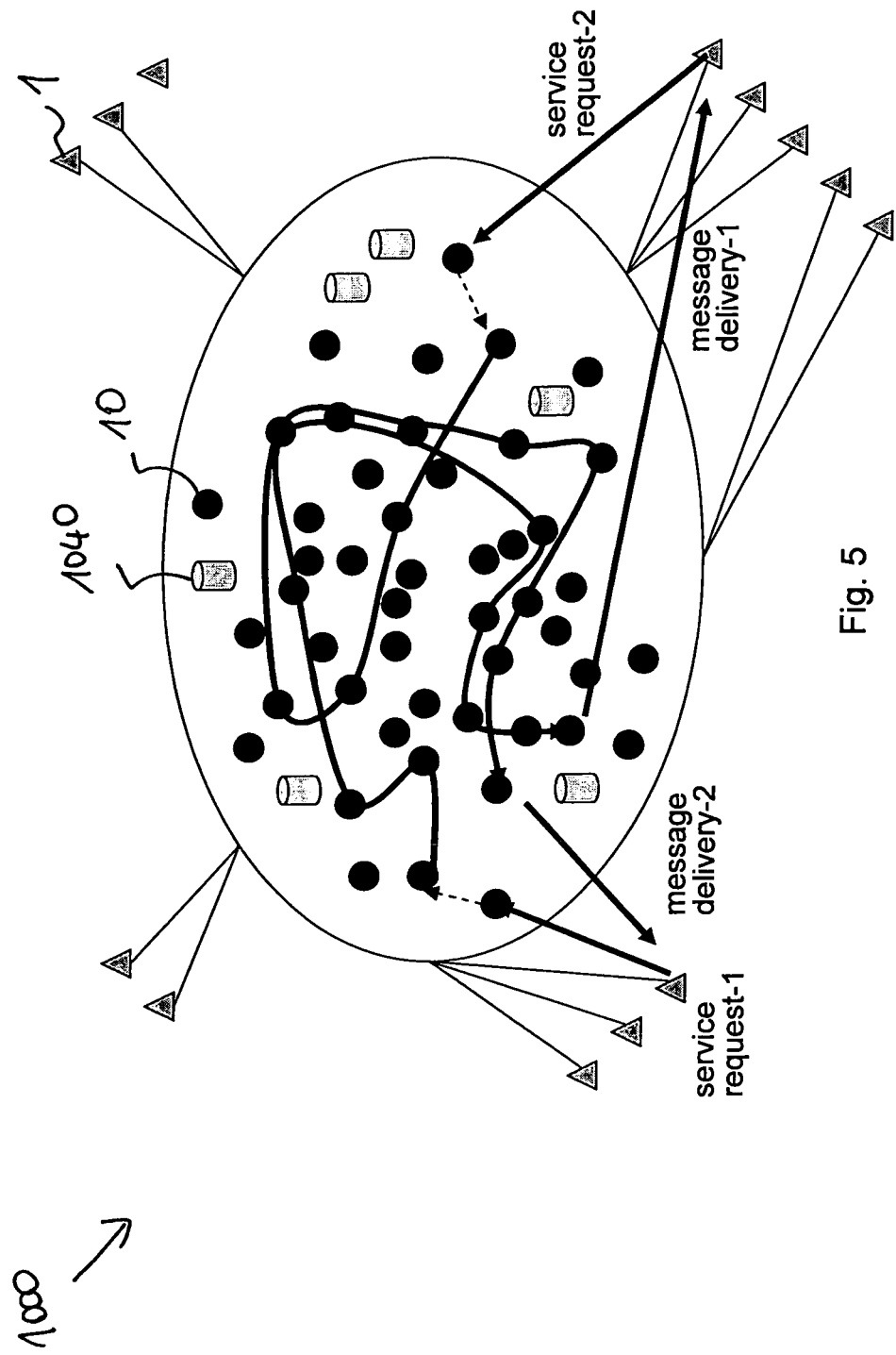
FIG. 5 schematically shows the execution of a service request according to a third embodiment of the invention.

Examples of services can be:
1. request-response services (schematically shown in FIG. 3) wherein the client entity requests a computation (e.g. an information service, an application service, a web service); the distributed service system 1000 performs the computation, through worker modules interactions; and the result is returned to the requesting client entity;
2. client-to-client services (schematically shown in FIG. 4) wherein an originating client entity requests a service to interact with a terminating client entity; the distributed service system 1000 performs the computation, through worker modules interactions; the terminating client entity receives an invitation message; and client entities are identified through logical names, dynamically mapped to physical addresses;
3. multiple service executions (schematically shown in FIG. 5) wherein several service executions (each service could be either of the request-response or client-to-client type) are correlated to a same service session (identified by a service session identifier) by means of information stored—as disclosed in detail below—in a session descriptor stored in a logical repository 1040.

The distributed service system 1000 of the invention could be used also to implement orchestration of web services, whose implementations are deployed on computing nodes. In this case, to invoke a web service an orchestrator will produce a tuple whose type will correspond to a web service declaration and containing as arguments information about the invocation, and its address (i.e., the orchestrator's address). The orchestrator may wait for the direct answer of the web service. Alternatively, if a compiler split the orchestrator in several worker modules (each of them being able to execute or invoke a web service and, optionally, to generate a tuple to invoke a subsequent web service), the answer could be returned as a tuple.

In the following description, the expression:
Wc_T: is used to indicate a worker module that consumes/processes tuples of type T;
Wp_T: is used to indicate a worker module that produces tuples of type T;
tuples_type(P): is used to indicate the set of tuple types that can be consumed/processed by the worker modules executed by a peer entity P.

Figure 6:
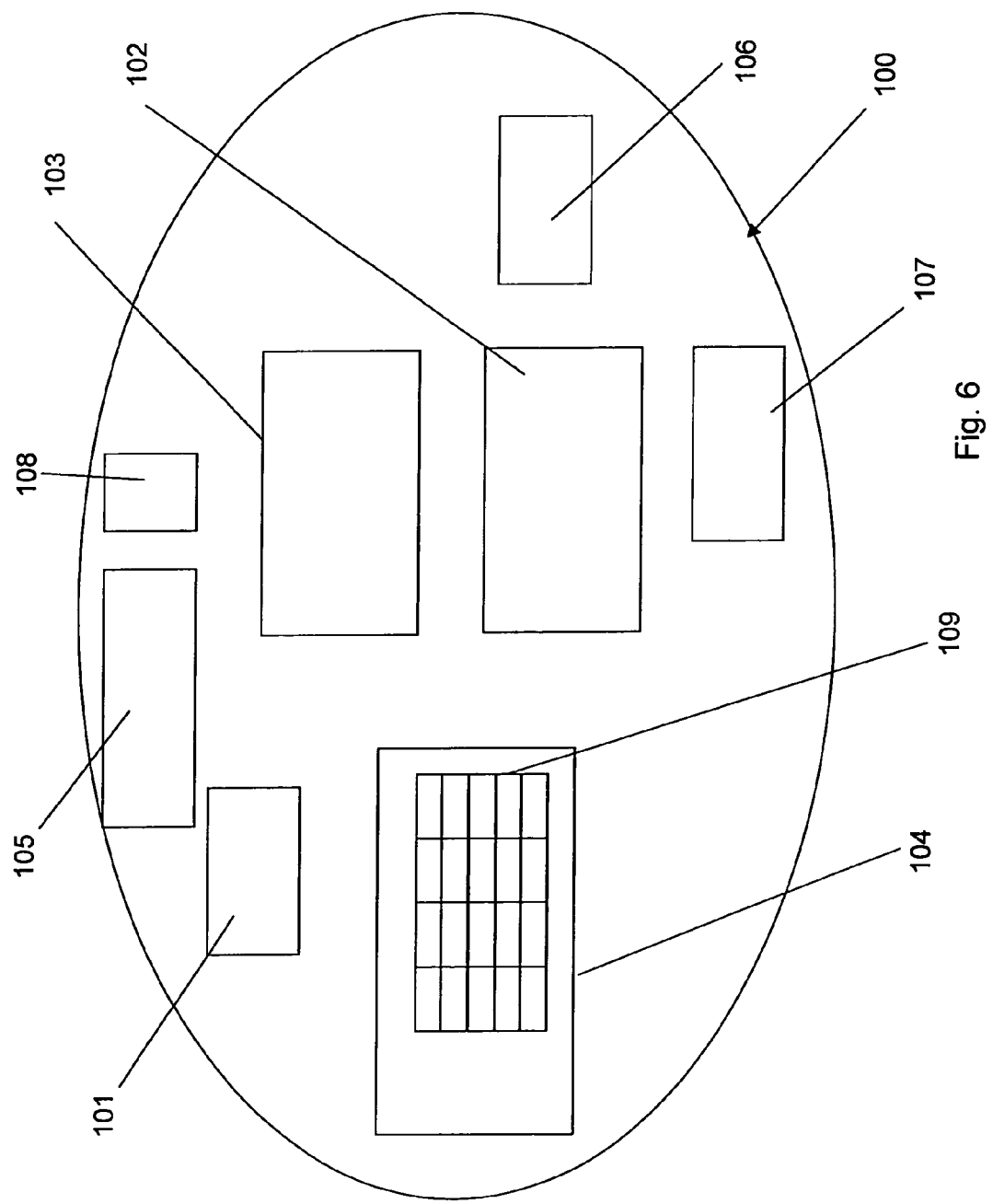
FIG. 6 schematically shows an embodiment of a peer entity of the distributed service system of FIG. 1.

As schematically shown in FIG. 6, each peer entity 100 advantageously comprises:
overlay management modules 101;
local tuple space modules 102;
worker execution environment modules 103;
tuple handling modules 104;
load handling modules 105;
client handling modules 106;

DHT (Distributed Hash linked-peer-table) modules 107;
service session descriptor handling modules 108.

The system 1000 may also comprise "passive" peer entities (for example, those deployed on end-user terminals 1020) that do not execute tasks but only have the function of routing tuples (e.g., from client entities to "active" peer entities). "Passive" peer entities (not shown) will advantageously comprise the overlay management modules 101; the local tuple space modules 102; the tuple handling modules 104; the client handling modules 106; and the DHT modules 107.

Overlay Management Modules

The overlay management modules 101 are adapted to handle the introduction of a new peer entity 100 in the system 1000.

In particular, for a peer entity 100 that aims at getting into the system 1000, the overlay management modules 101 perform a discovery phase, in order to find an initial set of neighbor peer entities of the system 1000. The dimension of the initial set (ISD) could be a parameter of the system 1000.

The discovery phase may be performed according to known mechanisms in the field of ad-hoc networks (e.g., the one disclosed by Jini™ Architectural Overview, Technical White Paper, 1999 Sun Microsystems, Inc., 901 San Antonio Road, Palo alto, Calif. 94303 U.S.A., pages 1-22).

If the dimension of the discovered peer entity set is greater than ISD, the overlay management modules 101 can perform a selection, possibly according to some policies (e.g., random, nearest physical addresses), in order to form the initial set of neighbor peers. Otherwise, if the dimension is lower than ISD, the overlay management modules 101 can, for example, select one of the discovered peer entity and send a request to it in order to get the missing initial neighbor peers. This procedure is advantageously repeated until the number of discovered peers gets to ISD, or the performed requests failed to return new peer entities.

A peer entity receiving the above mentioned request will be adapted to select from its linked-peer-table (described below) a number of addresses of peer entities, according to predetermined policies (e.g., according to techniques well known in the art as round-robin, lowest distance, and similar).

Local Tuple Space Modules

The local tuple space (or backboard) modules 102 are adapted to handle storing of tuples in a storage area of the peer entity 100.

Tuples are advantageously stored in the storage area according to their types.

Tuples are advantageously stored in the storage area with a timestamp, which indicates the time they were queued in storage area. The peer entity 100 can remove the tuples queued before a given time-interval and/or the older ones when the queues is full.

The local tuple space modules 102 are advantageously adapted to classify the tuples stored in the storage area of a peer entity P according to two groups (or queues):

a first tuple group (hereinafter also called waiting-queue), referring to tuples of tuples_type(P) waiting to be consumed by a worker module executed by the peer entity P; and a second tuple group (hereinafter also called pending-queue), referring to tuples of types that that the peer entity P cannot process nor distribute to other peer entities due to the fact that the linked-peer-table (described below) does not contain addresses of other peer entities able to consume such tuple types.

Worker Execution Environment Modules

The worker execution environment modules 103 are in charge of executing the worker modules 10 of the peer entity 100.

Each worker module 10 consumes tuples of at least one type Tc and produces one or more tuples, possibly of different types, according to a behavior programmed in a service logic.

The worker execution environment modules 103 are adapted to retrieve tuples from the waiting queue of the peer entity 100, according to some scheduling policies (e.g., auto-adaptative, by considering priorities depending on the lengths of the waiting-queues, and similar), and to activate the corresponding worker modules 10 able to consume them. If there are not tuples in the waiting queue, the workers execution environment modules 103 suspend, waiting for new tuples being queued in the waiting queue.

Moreover, as described in more detail below, the workers execution environment modules 103 may request the service session descriptor handling modules 108 to create, read, update, delete service session descriptors (identified though some unique identifiers, handled by means of a DHT algorithm), before and/or after the execution of a tuple by a worker module, depending on the tuple and/or on the instructions returned by the worker module 10.

In particular, before activating a worker module 10 for processing a tuple <tuple-type, session-id, data1, . . . datan>, the workers execution environment modules 103 will be adapted to read the service session descriptor identified by the field "session-id" (if not empty value), and pass the session-id and the corresponding retrieved value to the worker module 10.

Moreover, after consumption of a tuple, the workers execution environment modules 103 will be adapted to receive instructions concerning the service session descriptor from the worker module 10. Typical examples of instructions may be the following:

<create, session-id, session-descr> for requesting the creation of a new service session descriptor, identified by session-id, with "session-descr" as initial value;

<update, session-id, session-descr> for requesting the updating of the service session descriptor identified by session-id, with "session-descr" as new value;

<delete, session-id> for requesting the deletion of the service session descriptor identified by session-id.

In its turn, each worker module 10 is advantageously adapted to perform the following actions:

receiving a tuple t of type Tc from the workers execution environment modules 103, which could pass to the worker module 10 an associated session identifier and a corresponding service session descriptor (if any);

processing the tuple t according to a service logic associated with the worker module 10 and the service session descriptor data (if any) in order to execute the task represented by the tuple t of type Tc;

optionally, producing one or more tuples (possibly of one or more types different from the type Tc) and passing the produced tuples to a tuple routing function (described below);

terminating the processing of the tuple t, and optionally returning to the workers execution environment modules 103 instructions related to a session descriptor (e.g., for creating, deleting, or updating the session descriptor);

waiting to be newly activated by the workers execution environment modules 103.

Moreover, during the processing of a tuple t and the execution of the corresponding task, each worker module 10 could:

require the peer entity 100 to send messages to client entities 1, by using their actual physical addresses or their logical names (e.g. to be resolved by the DHT modules 107 through a DHT algorithm);

send, receive, wait for messages to/from another worker module (e.g., to return to the worker module that produced the tuple the result of its processing—e.g., to implement a RPC-like (Remote Procedure Call like) model, known in the art).

Service Session Descriptor Handling Modules

The service session descriptor handling modules 108 are adapted to handle data concerning a service session.

These data could be used in multiple service executions (schematically shown in FIG. 5) to correlate two or more service requests related to the same service session, or to synchronize/join parallel computations forked during the execution of a service request.

Service session descriptors are advantageously identified by a unique identifier, and are stored in repositories 1040 (preferably not handled by the peer entities) with persistency characteristics. The lifetime of the service session descriptors could be limited (the limits could be different according to the service typology).

As stated above, workers execution environments modules 103 may request service session descriptor handling modules 108 to create, read, update, delete service session descriptors (identified though unique identifiers), depending on the tuple type and/or instructions/data returned by the worker modules 10.

On request by the workers execution environments modules 103, the service session descriptor handling modules 108 are adapted to perform the following operations:

create (after the processing of a task represented by a tuple): for initializing the descriptor, by using the instructions returned by a worker module 10 (e.g., descriptor identifier indicated in the field "session-id", session descriptor data indicated in the field "session-descr"). This operation has the function of storing the service session descriptor in a repository 1040 (whose address can be discovered at the initialization phase of the peer entity): this operation is performed by interacting with the DHT modules 107 in order to create an association between the descriptor identifier and a physical address at which the service session descriptor is stored in the repository 1040;

delete (after the execution of a task represented by a tuple): for requesting the DHT modules 107 to retrieve the physical address associated with a descriptor identifier returned by a worker module, and to delete it; and to send to the repository 1040 the request to delete the service session descriptor stored at such physical address;

update (after the execution of a task represented by a tuple): for requesting the DHT modules 107 to retrieve the physical address associated with the descriptor identifier returned by a worker module 10 and for sending to the repository 1040 the request to update the session descriptor stored at such physical address with the data returned by the worker;

read (before the execution of a task represented by a tuple): for requesting the DHT modules 107 to retrieve the physical address associated with the descriptor identifier indicated in the field "session-id" (if not empty) of the tuple (<tuple-type, session-id, data1, . . . , datan>) to be consumed; sending to the repository 1040 the request to return the service session descriptor stored at such physical address; and, finally, proving the workers execution environments modules 103 with the retrieved service session descriptor so that they can activate the execution of the appropriate worker module giving as input both the tuple to be consumed and the service session descriptor so retrieved.

Client Handling Modules

Client handling modules 106 in peer entities 100 are adapted to interact with client entities 1, which are usually deployed on end-users terminals 1020.

In particular, they are adapted to send, receive and process messages to/from client entities 1.

Indeed, in order to be enabled to interact with the distributed service system 1000 and to access the services offered thereby, the client entities 1 are advantageously adapted to discover one or more peer entities 100 of the system 1000, for example by using conventional mechanisms known in the field of ad-hoc networks (e.g., the one disclosed by the above mentioned paper "Jini™ Architectural Overview").

Moreover, when a client entity 1 discovers a peer entity 100 of the system 1000, the client entity 1 is adapted to send to the discovered peer entity 100 a registration message, by providing its logical name and physical address. A periodical refresh of the registration could be required in order to extend time-validity of the association. These registration messages are received and processed by the client handling modules 106.

If an end-user terminal 1020 run both a client entity 1 and a peer entity 100 (e.g., a passive peer entity), then the client entity 1 deployed on the end-user terminal will be advantageously adapted to perform the registration at least before the peer entity 100 deployed on the end-user terminal 1020.

Client entities 1 are adapted to request services by sending service-request messages to the peer entities they are registered with.

The client handling modules 106 of peer entities 100 are adapted to receive and process said service-request messages to create a corresponding tuple representing the service request.

For instance, an example of service-request message could be the following: <service-request, client-entity-address, service-name, session-id, arg1, . . . , argn>, wherein "service-name" may represent a tuple type and "session-id" (optional) may be the identifier of the service session descriptor used to correlate multiple service requests. Moreover, the tuple created by the client handling modules 106 starting from such service request message could be the following: <service-name, session-id, arg1, . . . , argn, client-entity-address>> (wherein "service-name" represent the tuple type, and "client-entity-address" is one of the arguments of the tuple).

Client handling modules 106 are also advantageously adapted, by request of a worker module 10, to send service-return messages to client entities 1.

DHT Modules 107

The DHT modules 107 are adapted to handle a DHT (Distributed Hash Table) node associated with a peer entity 100 according to techniques well-known in the art (see, for example, Eng Keong Lua et al., "A survey and comparison of peer-to-peer overlay network schemes", IEEE Communications Surveys & Tutorials, March 2004, pages 1-22).

The DHT node of a peer entity 100 is advantageously used to map:

logical names to physical addresses of client entities 1; and identifiers of service session descriptors to physical addresses at which the service session descriptors are stored in the repository 1040.

The DHT modules 107 have two main functions:

a DHT node function for handling the DHT node associated with the peer entity, and in particular handling the creation, reading, deletion of said mapping; and a DHT client function to send requests to the DHT node function to perform operations (e.g., create, read, delete, ...) on the DHT node.

Some peer entities may implement only a DHT client function. In this case, the DHT client function will have to register to a DHT node function deployed in another peer entity of the system 1000.

When a client entity 1 performs its registration with a peer entity 100, it advantageously provides its logical name, in order to be identified during the execution of services involving it (e.g., to receive messages addressed to its logical name), and its physical address.

When the client handling modules 106 of a peer entity 100 receives a client entity registration request, they will require the DHT modules 107 of the peer entity to create, in the DHT node, an association of the logical name of the client entity with the physical address thereof.

When the client handling modules 106 of a peer entity 100 have to send a message to a client entity 1 identified through its logical name, they will interact with the DHT modules 107 of the peer entity 100 in order to retrieve the physical name of the client entity 1 (optionally, a possible time-limit of validity could be introduced).

When the service session descriptor handling modules 108 have to retrieve/modify a service session descriptor, they will interact with the DHT modules 107 of the peer entity, by providing the descriptor identifier and, in case of creation of a new descriptor, also the physical-address at which the descriptor is stored in the repository 1040. Depending on the required operation, the DHT modules 107 will either create an association between the descriptor identifier and the physical-address in the repository 1040, return the physical-address corresponding to the descriptor identifier, or delete the association in the DHT node.

Tuple Handling Modules

The tuple handling modules 104 are adapted to distribute tuples from producing worker modules to consuming worker modules deployed in the peer entities 100 of the system 1000.

Tuple distribution is advantageously performed by using a linked-peer-table 109 structured in the following way:

| Tuple Type | LinkedPeer 1 | LinkedPeer 2 | ... | LinkedPeer n |
|---|---|---|---|---|
| T-Type_m1 | peer-info m1 1 | peer-info m1 2 | ... | peer-info m1 n |
| T-Type_m2 | peer-info m2 1 | peer-info m2 2 | ... | peer-info m2 n |
| ... | ... | ... | ... | ... |
| T-Type_mN | peer-info mN 1 | peer-info mN 2 | ... | peer-info mN n | where

T-Type_mj represents a tuple type mj;

peer-info mj i represents information (herein after also called "peer-info entry") about a peer entity i that is able to consume/process tuples of type mj;

n is the maximum number of peer entities that in the linked-peer-table 109 can be associated to a tuple type mj (the actual number of peer entities could be different from type to type);

N is the maximum number of tuple types that can be stored in the linked-peer-table 109, according to a predetermined system parameter.

In the present description, the expression

"linked peers" with respect to a peer entity P, is used to indicate the peer entities that are listed in the linked-peer-table 109 of the peer entity P;

entry_list(T,P) is used to indicate the list of peer-info entries associated to a tuple type T in the linked-peer-table 109 of peer entity P.

Each peer-info entry about a linked peer entity advantageously comprises:

the address of the linked peer entity (e.g., an IP address); and an integer, indicating the distance (e.g., in hops) of the linked peer entity with respect to the peer entity P.

The linked-peer-table 109 is advantageously used by a peer entity P in order to:

forward a tuple of type T to a peer entity that is able to consume it (i.e., which has a worker module that is able consume tuples of the type T). These tuples could be either produced by one of the worker modules executed by the peer entity P, or received by another peer entity or in a message received by a client entity 1; or to interact with linked peer entities for system maintenance operations as, for example, overload control; reconfiguration of linked peer entities; and similar.

Each peer entity P is adapted to create and maintain its linked-peer-table 109.

The linked-peer-table 109 of a peer entity P is advantageously created when the peer entity P joins the system 1000.

For example, it can be initialized using the information of the initial neighbor peers by merging and selecting the available addresses.

The initial linked-peer-table 109 may be created by selecting the following peer-info entries:

for each tuple type mj that can be consumed by the worker modules executed by each of the initial neighbor peer entities, the peer-info entry containing information about such initial neighbor peer entity (the distance for these entry will be set to 1); and the peer-info entries having the shortest distance among those stored in the linked-peer-tables 109 of the initial neighbor peer entities (in this case, the distance for these entries will be incremented by 1 with respect to the one stored in the linked-peer-table 109 of the initial neighbor peer entities).

For each tuple type, the selected peer-info entries should be at most "n".

If the linked-peer-table 109 of a peer entity becomes empty (e.g., due to the fact that all the "linked" peer entities left the system or some failures happened), the initialization phase can be repeated, with the selection of a new set of initial neighbor peer entities.

Linked-peer-tables 109 are advantageously updated in order to take into account the communication attempts towards the "linked" peer entities. In particular, when there is a failure in the communication with a linked peer entity (e.g., when routing a tuple), all its addresses stored in the linked-peer-table 109 are removed.

Moreover, linked-peer-tables 109 are advantageously reconfigured by means of two mechanisms: passive mechanism and proactive mechanism.

Passive Mechanism

When a peer entity 100 allocates new worker modules 10, it advantageously send to its linked peers (or to a subset of them selected according to some policies) a message, herein after called "New-workers-Update" message, with the information concerning the worker modules 10 allocated during a predetermined previous period.

The same message is also advantageously sent when a peer entity 100 joins (or re-joins) the system 1000.

The New-workers-Update message advantageously contain the following information <New-workers-Update, sender-id, distance, La>, wherein
"New-workers-Update" is the identifier of the message type;
"sender-id" is the address of the original peer entity 100 sending the original New-workers-Update message;
"distance" is the distance in system hops between the original peer entity 100 and the current node (its value in the messages sent by the original peer entity 100 is set to 0);
La is the list of the tuple types consumed by the worker modules newly allocated.

When a peer entity P receives a New-workers-Update message, it processes the contained information and modifies its linked-peer-table 109, if necessary. In particular,
for each tuple type T in the list La:
if T is not present in the linked-peer-table 109, peer entity P adds the tuple type T to the linked-peer-table 109 and associates with it the peer-info entry <sender-id, distance+1>.
otherwise, if T is present in the linked-peer-table 109, the peer entity P verifies whether sender-id is already present in the entry_list(T,P). In case it is not found, the peer adds the peer-info entry <sender-id, distance+1> to entry_list(T,P), if there is some position still free. In case there is no position free, the peer entity P evaluates whether overwriting a peer-info entry in entry_list(T,P), according, for example, to the following criteria:
<sender-id, distance+1> replaces a peer-info entry with a distance greater than distance+1.

Moreover, the peer entity P forwards the New-workers-Update message to all the linked peers thereof (or to a subset of them selected according to some policies) except the one from which it received the message and except the original peer entity (i.e, sender-id) that originally sent the New-workers-Update message. In particular, the peer entity P forwards the New-workers-Update message by making the following changes:
incrementing the distance by 1;
removing from the list La the tuple types that did not cause a change in the linked-peer-table 109 of peer entity P.

In its turn, when a peer entity P deallocates all the worker modules 10 that are able to consume a tuple type T, it advantageously informs the potentially interested peer entities through a message, herein after called "Old-workers-Update" message.

The peer entities that are potentially interested to know that P deallocated worker modules able to consume a tuple type T can be, for example:
peer entities that previously routed to the peer entity P a tuple of type T;
peer entities in entry_list(T,P) involved in a load handling procedure (e.g., that previously sent to the peer entity P a "Request-queue-length" message as described in more detail below);
peer entities that previously sent to the peer entity P messages notifying their availability to process tuples of type T ("processing-available" messages as described in more detail below);
peers that previously sent to the peer entity P requests ("Request-for-peers" messages as described in more detail below) for peer entities able to process tuples of type T.

In order to implement this mechanism, a peer entity is advantageously adapted to store, e.g., attached to the linked-peer-table 109, information about peer entities that: previously routed tuples of type T to it, are involved in a load handling procedure, previously sent messages notifying their availability to process tuples of type T, and previously sent requests for peer entities able to process tuples of type T. For limiting the dimension of the used storage, the peer entity can adopt a timestamp mechanisms, to replace, when the storage is full, the older peer entities with the new ones.

The Old-workers-Update message advantageously contain the following information <Old-workers-Update, sender-id, T>, wherein
"Old-workers-Update" is the identifier of the message type;
"sender-id" is the address of the original peer entity sending the Old-workers-Update message;
"T" is the tuple type.

When a peer entity P receives the message <Old-workers-Update, sender-id, T>, it eliminates from the entry_list(T,P) the peer-info entry, if present, concerning the original peer entity (sender-id).

According to the above disclosed passive mechanism, any new worker module allocation or de-allocation in a peer entity is communicated to other peer entities of the system 1000. Information contained in the peer entity linked-peer-table 109 is thus updated by a peer entity any time a New-workers-Update or an Old-workers-Update message is received from another peer entity of the system 1000.

Linked-peer-tables reconfiguration is thus performed requiring neither a periodically refreshing of the information contained therein nor the use of timestamps.

Proactive Mechanism

The proactive mechanism can be used by a peer entity P to identify other peer entities of the system 1000 that have worker modules 10 able to process tuples of type T.

This mechanism can be activated by a peer entity P by sending a message, herein after called Request-for-Peers (or RfP) message.

The proactive mechanism may be activated by the peer entity P either during a tuple routing procedure (as disclosed in more detail below) when the peer entity P is not able to distribute a tuple of type T, or randomly, in order to verify whether it is possible to perform a local optimization of the system configuration, according to self-organization mechanisms well known in the art.

The peer entity P activating the proactive mechanism can select the "linked peers" to which sending the Request-for-Peer message according to the following criteria:
If the procedure is activated to route a tuple of type T1 produced by a worker We_T2 (i.e., able to consume tuples of type T2) of the peer entity P, the selected "linked peers" are those whose addresses are in entry_list(T2,P). Indeed, it is most likely that also these peer entities have to route tuples of type T1 and that they already have some address of peer entities able to consume tuples of type T1. The peer entity P will thus send the message <Request-for-Peers, address-P, T2, T1, N> to all the selected "linked peers", wherein "Request-for-Peers" is the identifier of the message, "address-P" is the address of the peer entity P originating the request, "T2" is the tuple type consumed by worker modules producing tuples of type T1, "T1" indicates the type of tuple to be routed, "N" is a limit of the lengths of forwarding chains.

If the procedure is activated to route a tuple of type T1 received by another peer entity 100 or in a message received by a client entity 1, the selected "linked peers" are those whose addresses are in entry_list(T,P), where T is a tuple type selected by peer entity P according to some policy (e.g., random selection, the associated list of addresses is not empty). The peer entity P will thus send the message <Request-for-Peers, address-P, T, T1, 0> to all the selected "linked peers".

If the procedure is activated randomly, the peer entity peer P may decide to select three tuple types T1, T2, and T3 in its linked-peer-table 109, according to some policies (e.g., random selection, empty list associated to T2, etc.), and send to all the peers in entry_list(T3,P) the message <Request-for-Peers, address-P, T1, T2, 1>.

When a peer entity P1 receives from a requesting peer entity P2 a message <Request-for-Peers, address-P2, Tx, Ty, j>, peer entity P1 retrieves from its linked-peer-table the entry_list(Ty,P1), and returns it to the peer entity P2 through a message <Request-for-Peers-Result, Ty, list-of-peer-info-entries>. If the entry_list(Ty,P1) is empty, and j>0, peer entity P1 forwards the message <Request-for-Peers, address-P2, Tx, Ty, j−1> to all the peer entities in entry_list(Tx,P1).

When the peer entity P2 that originally activated the Request-for-Peers procedure receives a message <Request-for-Peers-Result, Ty, list-of-peer-info-entries>, it updates the entry list(Ty,P), by merging it with the received list-of-peer-info-entries. Indeed, a Request-for-Peers message can result in one or more Request-for-Peers-Result messages (but also in zero messages).

The merge is advantageously performed in the following way:
 new peer-info entries are added to the entry_list(Ty,P), until the maximum length of said list in the linked-peer-table is reached;
 when the maximum length of the list is reached, further new entries are used to replace (only) the peer-info entries with a greater distance.

After the processing of a <Request-for-Peers-Result, Ty, list-of-peer-info-entries> message, the peer entity P2 is advantageously adapted to check if there are any tuples of type Ty queued in the pending-queue stored therein. In the positive case, it activates the tuple routing procedure (as described in more detail in the following) to attempt to distribute them to the peer entities newly entered in the linked-peer-table.

Accordingly, the proactive mechanism can be used by a peer entity P to reconfigure some entries of its linked-peer-table, by using the information contained in the linked-peer-table of some of its "linked" peer entities.

Routing of the Tuples

The tuple routing procedure may be used by a peer entity P when:
 a worker executed by the peer entity P produces a tuple; or
 the peer entity P receives a tuple from another peer entity or in a message received from a end-user terminal 1020; or
 the peer entity P reconfigures its linked-peer-table 109 after the receipt of a Request-for-Peers-Result message (in response to a Request-for-Peers message) in order to attempt to distribute tuples of type Ty—queued in the pending-queue—to peer entities newly entered in the linked-peer-table 109 of peer entity P.

Figure 7:
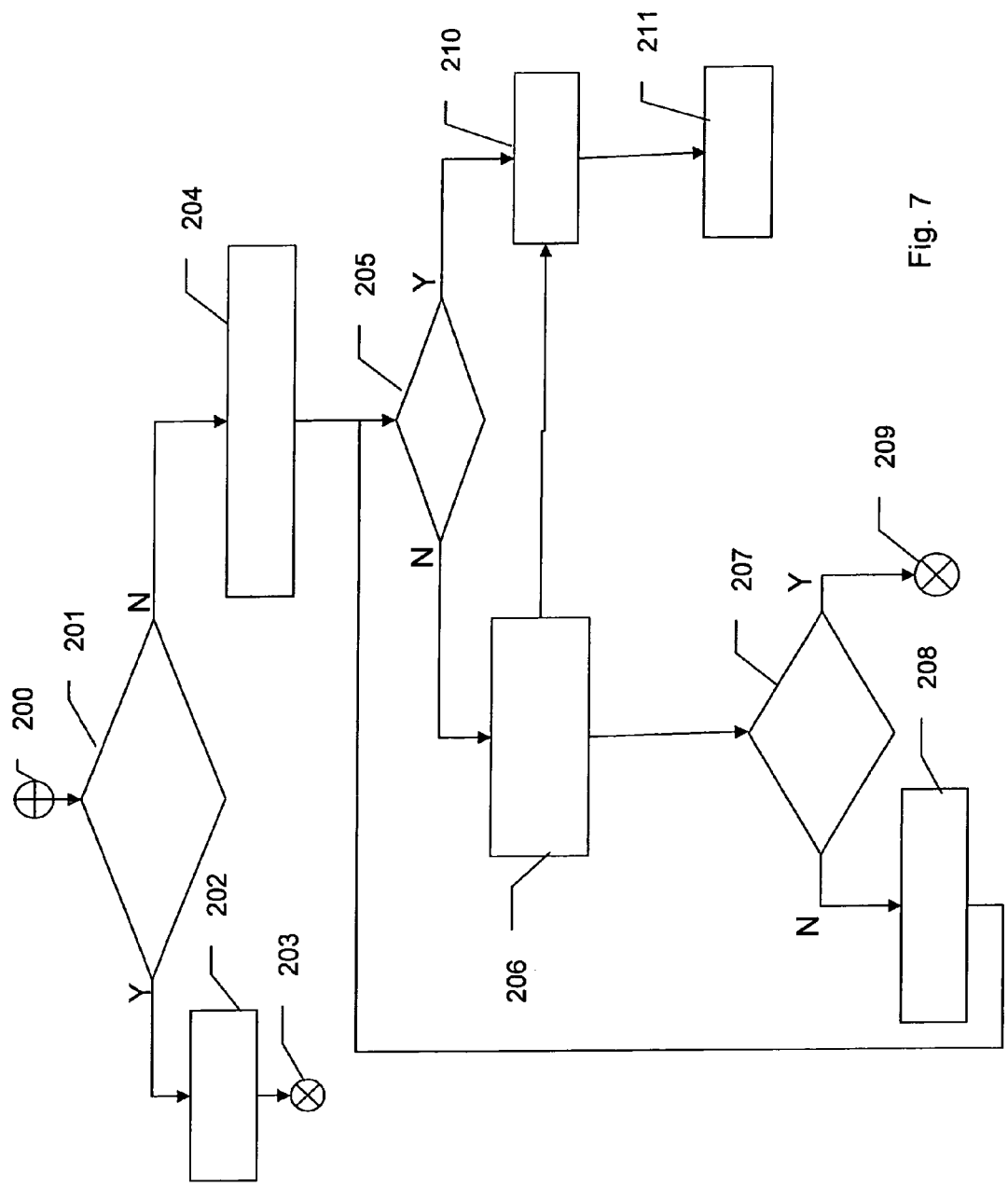
FIG. 7 schematically shows a flow chart of a tuple routing procedure according to an embodiment of the invention.

As schematically shown in FIG. 7, the distribution of a tuple t of type T (block 200) is advantageously performed in the following way:
 peer entity P checks if it comprises a worker module Wc_T (i.e., able to consume tuples of type T) (block 201);
 if a worker module Wc_T is comprised in peer entity P, than peer entity P takes in charge the execution of t, by queuing it in the waiting-queue thereof, associated to T (block 202) and the procedure ends (block 203);
 if a worker module Wc_T is not comprised in peer entity P, peer entity P retrieves entry list(T,P) (block 204) and checks if the list is empty (block 205);
 if the entry list(T,P) is not empty,
  it forwards the tuple t to one of the peer entities (e.g., P1) listed in the entry_list(T,P) (block 206), selected according to some forwarding policies (e.g., round-robin, nearest-peer in terms of system hoops, and similar). Advantageously, the forwarding policies are adapted to avoid loops and to limit the forwarding length. For example, to implement these policies the list of the peers that previously performed the forwarding should be inserted as argument in the forwarded tuples);
  then the peer entity P checks if the forwarding step at block 206 was successful (block 207);
  in case of failure (e.g., because the peer left the system 1000, or due to a communication failure), the peer-info entries on peer entity P1 are removed from the entry_list(T,P) (block 208) and the procedure returns at block 205;
  in case of success, the procedure ends (block 209);
 if the entry_list(T,P) is empty or the forwarding to all the peer in the list failed either for communication failures or for forwarding policies violation (i.e., if peer entity P is not able to distribute the tuple t of type T), the peer entity P:
  stores the tuple t in pending-queue associated with the type T (block 210), and
  activates the pro-active mechanism to look for new peer entities able to consume tuples of type T (block 211).

Load Handling Modules

Load handling modules 105 are adapted to periodically check the load of a peer entity 100 with respect to tuples processing and to execute a load balancing procedure, if necessary.

In general, in a computing cycle it should be possible for a peer entity P to consume 100-1000 tuples as a whole.

Different algorithms could be adopted for estimating the load of a peer entity 100 for a next computing cycle.

According to an exemplary algorithm:
 Each peer entity P computes, for each tuple type in tuple_types(P), the average of the tuples received (including the ones produced by the peer entity P) in the last k periods (aRt(T), where T is a tuple type).
 Each peer entity P computes, for each tuple type in tuple_types(P), also the average of the computation time for the worker modules to consume those tuples (aCT(T), where T is a tuple type).
 Each peer entity P determines the length QL(T) of the waiting-queue for tuple type T (i.e., the number of tuples of type T queued in the waiting-queue).

Then, the load may be estimated as follows:
 estimated load for tuple type T: $EL(T)=aCT(T)*(aRt(T)+QL(T))/\text{time-interval}$
 estimated total load of peer P is: $EL=\Sigma EL(T)$, for all types T in tuple_types(P).

Figure 8:
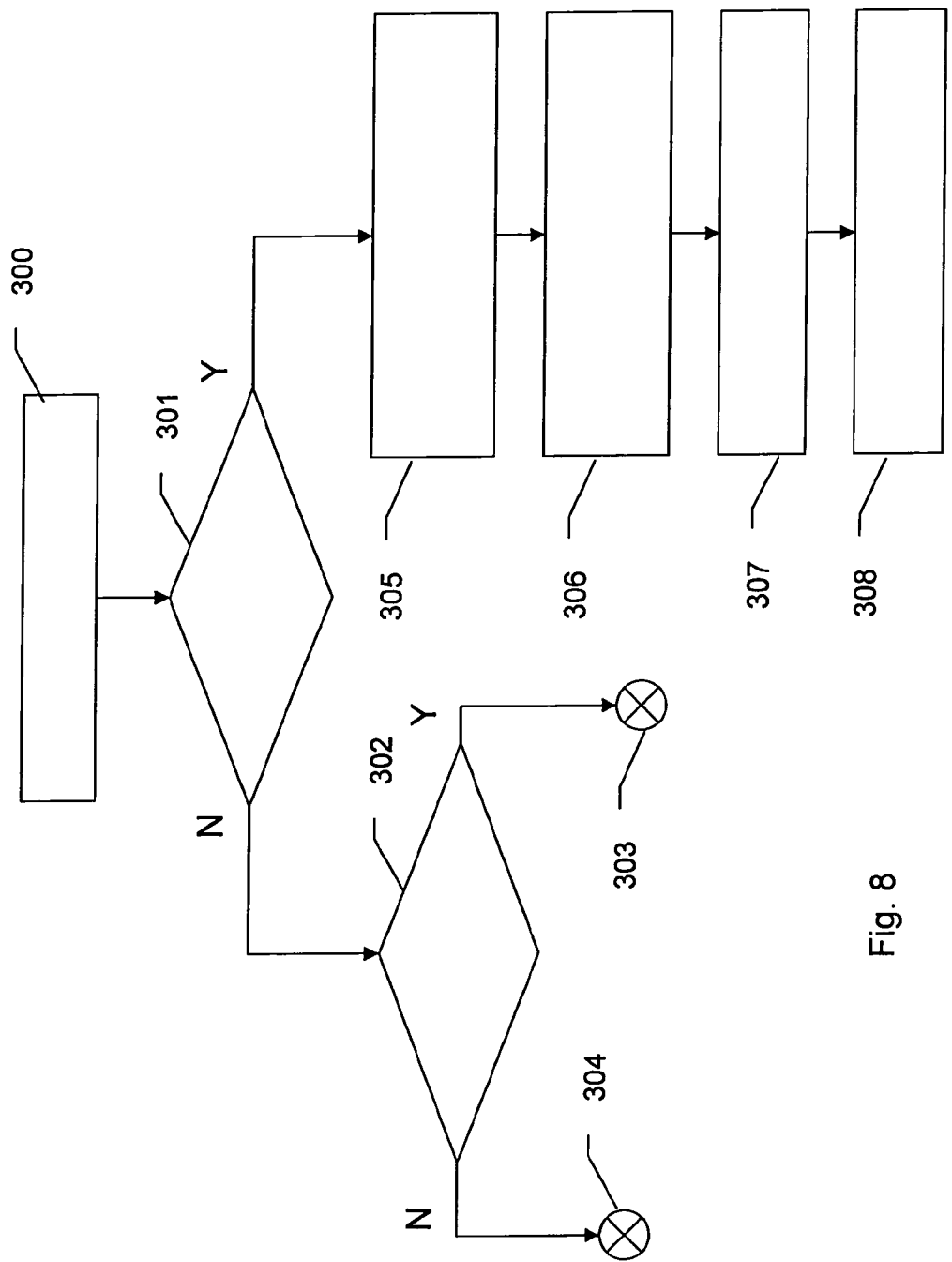
FIGS. 8-10 schematically show flow charts of a load balancing procedure according to an embodiment of the invention.
Figure 9:
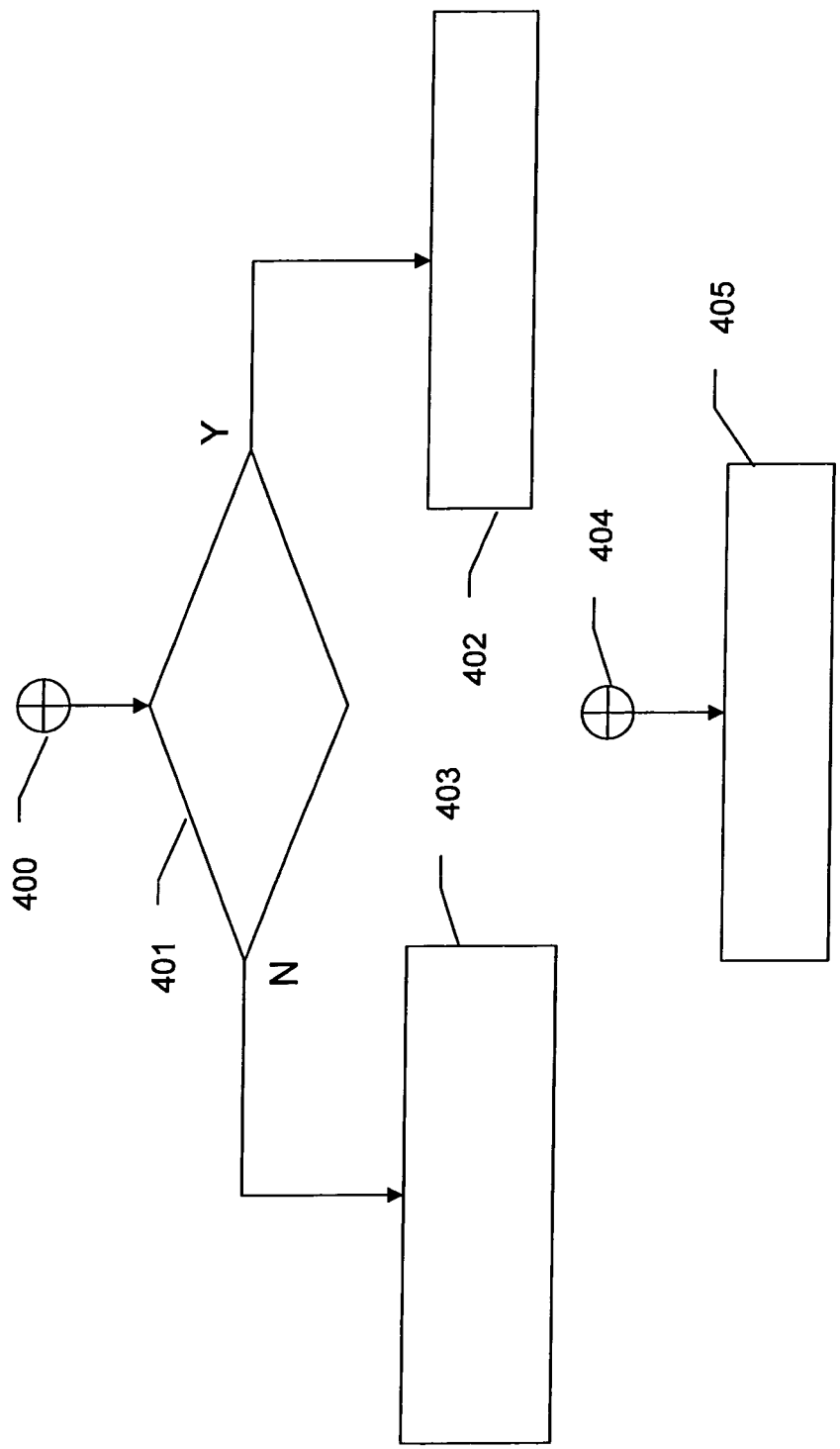
Figure 10:
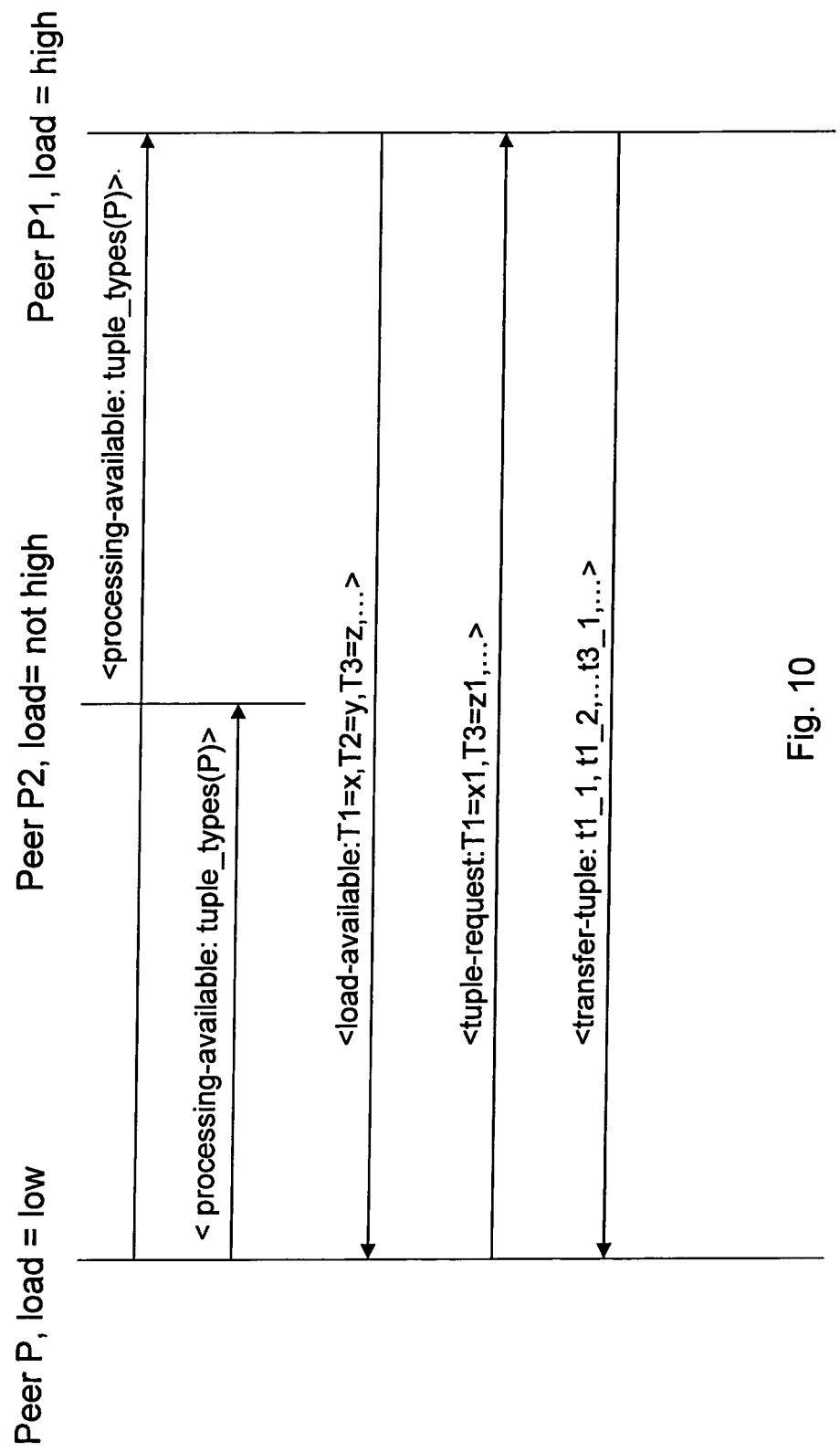

As schematically shown in FIGS. 8-10, at each computing cycle each peer entity P is adapted to compute its total load value EL (block 300, FIG. 8) and to check if the computed value is lower than a first given m_threshold(P) value (block 301, FIG. 8).

In the negative case, the peer entity P is adapted to check if the computed value is higher than a second given M_threshold(P) value (block 302, FIG. 8).

The two thresholds m_threshold(P) and M_threshold(P) typically depend on the characteristics of the computing nodes on which the peer entity P is deployed.

If the computed value is greater than the second given M_threshold(P) value, the peer load state is set to high (block 303, FIG. 8). Otherwise, the peer load state is set to normal (block 304, FIG. 8).

If the estimated total load value EL is lower than the first m_threshold(P) value, the peer load state is set to low and the peer entity P notifies (block 305, FIG. 8) the low load state thereof to the "linked" peer entities that are able to consume the same types of tuples consumable by it (i.e., the peers in entry_list(T,P), for each of the tuple types T in tuple_types (P)).

For example, the peer entity P may notify said "linked" peer entities by sending a message, herein after called "processing-available" message, of the type <processing-available, tuple_types(P)>, wherein "processing-available" is the message identifier and "tuple_types(P)" indicates the tuple types that peer entity P is able to process.

A peer entity P1 that receives a processing-available message (block 400, FIG. 9) is adapted to check if its estimated total load value EL is high (block 401, FIG. 9).

If the estimated total load value EL is high, the peer entity P1 is adapted to identify the number of tuples that it could transfer to the notifying peer entity P (block 402, FIG. 9).

For example, such number can correspond to the number of tuples that guarantees the load state of the peer entity P1 to return normal.

Moreover, at block 402, the peer entity P1 is adapted to send back to the notifying peer entity P a message, herein after called "load available" message, of the type <load-available, T1=x,T2=y,T3=z, . . . > wherein "load available" is the message identifier, and T1=x, T2=y, T3=z, . . . indicate, for each of the tuple types T1, T2, T3 . . . received in the processing-available message, the number (x, y, z, . . . ) of tuples that could be transferred from peer entity P1 to peer entity P.

If the estimated total load value EL of peer entity P1 is not high, the peer entity P1 is adapted to respond with a message indicating that it has no tuples available (block 403, FIG. 9).

After sending a processing-available message, the peer entity P waits for load-available messages (block 306, FIG. 8). Zero or more messages could be received, depending on the load state of the contacted "linked" peer entities. When the peer entity P receives a load-available message from peer entity P1, it evaluates (block 306) how many tuples it can accept by considering its current estimated total load value EL, updated in order to consider also the tuples already requested (by means of a tuple-request message) from the other overload "linked" peers. Indeed, the peer entity P can accept a number of tuples guaranteeing that its load state does not become "high".

If the peer entity P can accept additional tuples, it sends (block 307, FIG. 8) to peer entity P1 a message (hereinafter called "tuple-request" message) of the type <tuple-request, T1=x1, T3=z1, . . . >, wherein x1, z1, . . . are the numbers of tuples for each of the types that peer entity P is able to accept, with x1<=X, z1<=z, . . . .

When peer entity P1 receives the tuple-request message (block 404, FIG. 9), it returns (block 405, FIG. 9) to peer entity P a message (hereinafter called "transfer-tuple" message) of the type <transfer-tuple: t1, t2, t3, . . . > containing (at most) the required amount of tuples for each type, de-queued from the corresponding waiting-queues.

When peer entity P receives a transfer-tuple message, it queues the received tuples in the corresponding waiting-queues (block 308).

Dynamic Allocation/Deallocation of Worker Modules

Load handling modules 105 in a peer entity P are advantageously adapted to perform also a load handling procedure to handle worker module allocation/deallocation in the peer entity.

According to this load handling procedure, load handling modules 105 are adapted to periodically check if in the waiting-queue of peer-entity P there is at least one tuple type T having an average permanence time in such waiting-queue lower than a given threshold.

In the positive case, the load handling modules 105 are also adapted to check, for the linked peers in entry_list(T,P), the average permanence time of said at least one tuple type T in the waiting-queue of said linked peers.

According to an embodiment, the average number of tuples of type T queued in the waiting-queue (or average queue-length) of a peer entity can be used as information indicative of the average permanence time of the tuples of type T in the waiting-queue of such peer-entity.

The check with the linked peer entities in entry_list(T,P) can be performed by sending them a message (hereinafter called "request-queue-length" message, of the type <request-queue-length, T, my-queue-length>) to request such linked peer entities for the average permanence time of the tuples of type T in the waiting-queue thereof.

The contacted peer entities can answer with a message (hereinafter called "response-queue-length" message) of the type <response-queue-length, T, my-queue-length> where, my-queue-length will indicate the current average permanence time of the tuples of type T in the waiting-queue thereof.

When the average permanence time is below a given threshold for all the linked entities in entry_list(T,P), load handling modules 105 nominate at least one worker module Wc_T able to consume tuple of type T as candidate for worker de-allocation in peer entity P. Worker module(s) Wc_T remain candidate until said average permanence time increases above the threshold or the peer entity P receives a old-workers-update message indicating that worker modules Wc_T have been de-allocated by another peer entity of the system 1000. In this latter case, the load handling modules 105 of peer entity P advantageously wait for a given number of computing periods before computing the average permanence time for type T again, for taking into account a stable situation after the de-allocation of a Wc_T.

Advantageously, load handling modules 105 of a peer entity P actually de-allocate worker modules Wc_T, candidate for worker deallocation, only when for peer entity P there are worker modules, adapted to consume tuple types other than T, candidate for worker allocation.

Worker modules adapted to consume tuples of type T' can be nominated as candidate for worker allocation by the load handling modules 105 when:

the average permanence time of tuples of type T' in the pending-queue of peer entity P is above a given threshold or the life-time of some of the queued tuples is almost to expire; or the Request-for-Peers procedure (described above) for tuples of type T' failed.

Load handling modules 105 can decide to allocate worker modules without de-allocating other worker modules if the peer entity has some available resources (that is, if its load is not high, it has some memory available to allocate the new worker module and the related supporting data structure).

Otherwise, load handling modules 105 can verify if the resources released by some de-allocation candidate Wc_T are suitable to support the allocation of candidate Wc_T'. In that case, the load handling modules 105 perform the de-allocation of worker modules Wc_T, and the allocation of worker modules Wc_T'.

Alternatively, if a peer entity P, having some allocation candidate Wc_Ta but not de-allocation candidates, receives from a peer entity P1 a load-available message, it could answer with a message (herein after called "candidate-available" message of the type <candidate-available, Ta>), in order to propose the peer entity P1 to allocate worker modules Wc_Ta able to consume tuples of type Ta. Peer entity P1 can evaluate the feasibility of the allocation (e.g., by possibly de-allocating some of its de-allocation candidates). If the evaluation gives a positive answer, peer entity P1 returns a message (hereinafter called "candidate-available-accepted" message of the type <candidate-available-accepted, Ta>) and performs the allocation/de-allocation procedure.

When load handling modules 105 of a peer entity decide to de-allocate worker modules Wc_T, they will perform the following main actions:
- informing the "linked" peer entities with a old-workers-update message (as described above);
- executing the tuples in the waiting-queue associated with the type T;
- blocking the execution of new incoming tuples of type T, by re-routing them to other peer entities, according to the tuple routing procedure described above;
- actually de-allocating the worker modules Wc_T by de-installing the corresponding software code from the peer entity.

Moreover, when the load handling modules 105 of a peer entity decide to allocate new worker modules Wc_T', they will perform the following main actions:
- informing the "linked" peer entities with a new-workers-update message (as described above);
- accessing some (remote) "code" repositories to retrieve the software code of a worker module Wc_T' that is able to consume tuples of type T'; and
- installing the retrieved software code in the peer entity.

Accordingly, the load handling modules 105 are adapted to dynamically allocate/deallocate worker modules with a mechanism that limits the number of reconfiguration/updating operations on the linked-peer-table 109 of the peer entities of the system 1000.

In view of the above description it will be clear that the present invention, in the various aspects thereof, provides a distributed service system for the execution of services requested by users in a distributed way.

According to an example of a request-response service (of the type schematically shown in FIG. 3), a user desiring a location-depending fee-payment information service can send a request for the service to the distributed service system by using a client entity deployed on its end-user terminal (e.g., a mobile phone).

The client entity will send the service request to a peer entity it is registered with. The client handling modules of the peer entity will generate a tuple t1 of type T1 representing the first task to be executed to execute the requested service (e.g., user authentication and authorization). The tuple t1 will comprise, for example, information about the user identity, the type of end-user terminal, and the type of service requested by the user, and will be processed by a worker module Wc_T1 of the system.

By using the data comprised in the tuple t1, the worker module Wc_T1 will perform the authentication and authorization procedures and will produce a tuple t2 of type T2 representing the further tasks to be executed to continue the execution of the service.

The tuple t2 will be will be processed by a worker module Wc_T2 of the system that, by using the data comprised in the tuple t2, will be able—for example—to handle the charging of the service and to produce a tuple t3 of type T3 representing the further task to be executed to continue the execution of the service.

The tuple t3 will be will be processed by a worker module Wc_T3 of the system that, by using the data comprised in the tuple t3, will be able—for example—to determine the geographical position of the user and to produce a tuple t4 of type T4 representing the further task to be executed to continue the execution of the service.

The tuple t4 will be will be processed by a worker module Wc_T4 of the system that, by using the data comprised in the tuple t4, will be able—for example—to retrieve the content requested by the user and to produce a tuple t5 of type T5 representing the further task to be executed to continue the execution of the service.

The tuple t5 will be will be processed by a worker module Wc_T5 of the system that, by using the data comprised in the tuple t5, will be able—for example—to translate the retrieved content according to the type of the end-user terminal and to produce a tuple t6 of type T6 representing the further task to be executed to continue the execution of the service.

The tuple t6 will be will be processed by a worker module Wc_T6 of the system that, by using the data comprised in the tuple t6, will be able—for example—to send a service-return message to the client entity of the user.

Tuples t1 to t6 will be distributed in the system from worker modules producing them to worker modules adapted to consume them thanks to the procedures disclosed above.

According to an example of multiple service executions (of the type schematically shown in FIG. 5), a user A desiring to establish a multi-media session with a user B can send a request to the distributed service system by using a client entity deployed on its end-user terminal (e.g., a mobile phone).

The client entity of user A will send the service request to a peer entity it is registered with. The client handling modules of the peer entity receiving the request will generate a tuple t1 of type T1 representing the first task to be executed to execute the requested service (e.g., user authentication and authorization). The tuple t1 will comprise, for example, information about the user identity, the type of end-user terminal, the type of session requested by the user A and a logical address of user B. The tuple t1 will be processed by a worker module Wc_T1 of the system.

By using the data comprised in the tuple t1, the worker module Wc_T1 will perform the authentication and authorization procedures and will produce a tuple t2 of type T2 representing the further tasks to be executed to continue the execution of the service.

The tuple t2 will be processed by a worker module Wc_T2 of the system that, by using the data comprised in the tuple t2, will be able—for example—to handle the charging of the request and to produce a tuple t3 of type T3 representing the further task to be executed to continue the execution of the service.

The tuple t3 will be will be processed by a worker module Wc_T3 of the system that, by using the data comprised in the tuple t3, will be able—for example—to retrieve the physical address associated with the logical address of user B; to create a multimedia service session by requesting the service session descriptor handling modules to create a new service session descriptor for such session and memorizing the logical address of user A in the service session descriptor thus created; and to send an invite message (comprising data concerning the service session and the session identifier) to the client entity deployed on the end-user terminal of user B.

If user B wishes to accept the invite message, he/she can send an acknowledge message to user A by using the client entity deployed on its end-user terminal.

The client entity will send the service request of user B to a peer entity it is registered with. The client handling modules of the peer entity will generate a tuple t1' of type T1' representing the first task to be executed to execute the requested service (e.g., user authentication and authorization). The tuple t1' will comprise, for example, information about the user identity, the type of end-user terminal, the identifier of the session, etc etc. The tuple t1' will be processed by a worker module Wc_T1' of the system.

By using the data comprised in the tuple t1', the worker module Wc_T1' will perform the authentication and authorization procedures and will produce a tuple t2' of type T2' representing the further tasks to be executed to continue the execution of the service.

The tuple t2' will be processed by a worker module Wc_T2' of the system that, by using the data comprised in the tuple t2', will be able—for example—to execute the charging of the request and to produce a tuple t3' of type T3' representing the further task to be executed to continue the execution of the service.

The tuple t3' will be processed by a worker module Wc_T3' of the system that, by using the data comprised in the tuple t3', will be able—for example—to retrieve the physical address associated with the logical address of user A by requesting the service session descriptor handling modules to read the session descriptor associated with the session; and to send an acknowledge message (comprising data concerning the service session and the session identifier) to the client entity deployed on the end-user terminal of user A.

In view of the above description it will be clear that the present invention, in the various aspects thereof, provides a distributed service framework for the execution of services in a distributed way, which guarantees:

- scalability in terms of processing nodes (servers and end-user terminals); peer entities; worker module types (wherein a worker module type is different from another worker module type depending on the tuple type it is able to consume and how it processes the consumed tuples); and instances of a same worker module type;
- reliability/robustness with respect to failures of computing nodes, peer entities and worker modules;
- high performances in terms of load balancing, worker modules allocation/deallocation, linked-peer-tables reconfiguration/updating, tuples distribution among the peer entities of the system; and
- a peer-to-peer model which does not require any centralized control and/or management function, with capabilities of self-organization, self-configuration, self-adaptation to highly dynamic environments and autonomic behaviour.

The invention claimed is:

1. A system for executing services in a distributed way, execution of each service comprising processing of a plurality of tasks of predetermined types, each task type to be processed being represented by a corresponding type of tuples of data relating to the task type, wherein:
   the system comprises a plurality of peer entities;
   each peer entity is capable of being adapted to store and execute a plurality of worker modules, each worker module capable of being adapted to process at least one task type; and
   each peer entity comprises tuple handling modules that, for a tuple of a type T, are capable of being adapted:
   a) to check if at least one of the plurality of the worker modules in the peer entity is capable of being adapted to process the task represented by said tuple,
   b) in the positive case of a), to take charge of the processing of the task represented by said tuple, and
   c) in the negative case of a), to execute a forwarding procedure for forwarding said tuple to another peer entity of the plurality of peer entities of the system.

2. The system according to claim 1, wherein the tuple handling modules of each peer entity are capable of being adapted to handle a linked-peer-table stored in the peer entity for associating, with each tuple type of a predetermined number of tuple types, a list of linked peer entities of a system that comprises worker modules capable of being adapted to process tuples of said tuple type.

3. The system according to claim 2, wherein, in a forwarding procedure of c), the tuple handling modules are capable of being adapted to access the linked-peer-table to retrieve, according to predetermined forwarding policies, one of the linked peer entities that in the linked-peer-table is associated with the tuple type T.

4. The system according to claim 3, wherein, when the linked-peer-table does not contain any linked peer entity associated with the tuple type T, the tuple handling modules of each peer entity are capable of being adapted to send to a number of peer entities of the system, selected according to predetermined policies from those listed in the linked-peer-table stored in the peer entity, a request for a peer entity of the system that comprises at least one worker module capable of being adapted to execute tuples of the type T.

5. The system according to claim 1, wherein each peer entity comprises tuple space modules capable of being adapted to handle storing of a predetermined number of tuples in the peer entity.

6. The system according to claim 5, wherein the tuple space modules are capable of being adapted to classify the predetermined number of tuples stored in the peer entity according to a first and a second group of tuples, the first group comprising tuple types representing task types that can be processed by the worker modules of the peer entity, and the second group comprising tuple types representing task types that cannot be processed by the worker modules of the peer entity.

7. The system according to claim 6, wherein each peer entity comprises load handling modules capable of being adapted to periodically check if, in the first group of tuples stored therein, there is at least one tuple type having an average permanence time in the first group lower than a given threshold.

8. The system according to claim 7, wherein, when there is at least one tuple type having an average permanence time in the first group lower than said given threshold, the load handling modules are capable of being adapted to check, for at least another peer entity of the system, an average permanence time of said at least one tuple type in the first group of tuples of said at least another peer entity.

9. The system according to claim 8, wherein, when the average permanence time of said at least one tuple type is lower than a given threshold also for said at least another peer entity of the system, the load handling modules are capable of being adapted to nominate at least one of the worker modules of the peer entity, which is able to process tuples of said at least one tuple type, as candidate for being de-allocated.

10. The system according to claim 6, wherein each peer entity comprises load handling modules capable of being adapted to nominate a worker module, which is able to process a tuple type in the second group of tuples, as candidate for being allocated within the peer entity when at least one of the following conditions is met: said tuple type has an average permanence time in the second group of tuples higher than a given threshold; said tuple type has in the second group a life-time almost to expire; and a request made by the peer entity for another peer entity of the system that comprises at least one worker module capable of being adapted to execute said tuple type, has failed.

11. The system according to claim 9, wherein the load handling modules are capable of being adapted to de-allocate a worker module of the peer entity, nominated as candidate for worker module de-allocation, when in the peer entity there is at least one worker module nominated as candidate for worker module allocation.

12. The system according to claim 10, wherein the load handling modules are capable of being adapted to allocate in the peer entity a worker module, nominated as candidate for worker module allocation, when the peer entity has a workload with respect to tuples processing lower than a predetermined threshold.

13. The system according to claim 1, wherein the tuple handling modules of each peer entity are capable of being adapted to perform a), b) and c) on a tuple produced by a worker module of the peer entity or received by another peer entity of the system.

14. The system according to claim 1, further comprising a plurality of client entities, each client entity capable of being adapted to send service requests to at least one of the plurality of peer entities.

15. The system according to claim 14, wherein the tuple handling modules of each peer entity are capable of being adapted to perform a), b) and c) on a tuple generated by the peer entity upon receipt of a service request from one of the plurality of client entities, the generated tuple representing one of the plurality of tasks involved in the execution of the service requested by the client entity.

16. A peer entity for a system for executing services in a distributed way, execution of each service comprising processing of a plurality of tasks of predetermined types, each task type to be processed being represented by a corresponding type of tuples of data relating to the task type, wherein the peer entity is capable of being adapted to store and execute a plurality of worker modules, each worker module capable of being adapted to process at least one task type, and the peer entity comprises tuple handling modules that, for a tuple of a type T, are capable of being adapted:
  a) to check if at least one of the plurality of the worker modules in the peer entity is capable of being adapted to process the task represented by said tuple,
  b) in the positive case of a), to take charge of processing of the task represented by said tuple, and
  c) in the negative case of a), to execute a forwarding procedure for forwarding said tuple to another peer entity of the system.

17. A method for handling tuples in a peer entity of a plurality of peer entities of a system for executing services in a distributed way, wherein execution of each service comprises processing of a plurality of tasks of predetermined types, each task type to be processed being represented by a corresponding type of tuples of data relating to the task type and each peer entity of the system capable of being adapted to store and execute a plurality of worker modules, each worker module capable of being adapted to process at least one task type for a tuple of a type T stored in the peer entity, the method comprising:
  a) checking if at least one of the plurality of worker modules in the peer entity is capable of being adapted to process the task represented by said tuple,
  b) in the positive case of a), making the task represented by said tuple to be processed by said at least one of the plurality of worker modules of the peer entity that is capable of being adapted to process the task, and
  c) in the negative case of a), executing a forwarding procedure for forwarding said tuple to another peer entity of the plurality of peer entities of the system.

* * * * *